United States Patent Office 3,833,595
Patented Sept. 3, 1974

3,833,595
2-AROYLALKYL BENZOMORPHANS

Toshio Atsumi, Kenji Kobayashi, and Yoshiaki Takebayashi, Takarazuka, and Hisao Yamamoto, Nishinomiya, Japan, assignors to Sumitomo Chemical Company, Limited, Osaka, Japan
No Drawing. Continuation-in-part of application Ser. No. 883,319, Dec. 8, 1969. This application Aug. 10, 1971, Ser. No. 170,640
Claims priority, application Japan, Dec. 26, 1968, 43/96,270, 43/96,271; Aug. 14, 1970, 45/71,637, 45/71,638; Sept. 17, 1970, 45/81,810, 45/81,811; Oct. 20, 1970, 45/92,611, 45/96,301; Dec. 8, 1970, 45/109,972, 45/109,973; Dec. 17, 1970, 45/114,363; Dec. 24, 1970, 45/130,369; Dec. 28, 1970, 46/129,967, 46/129,968; Jan. 29, 1971, 46/3,397; Dec. 1, 1971, 46/3,900
Int. Cl. C07d 39/00
U.S. Cl. 260—293.54                              44 Claims

ABSTRACT OF THE DISCLOSURE

Benzomorphan derivatives of the formula:

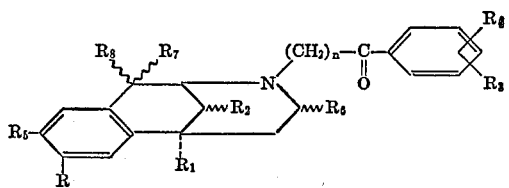

wherein R is a hydrogen atom, a $C^1$-$C^3$ alkoxy group, an acyloxy group, a hydroxy group, a nitro group, a halogen atom, a cyano group, an amino group, a carboxyl group, a carbamoyl group or a sulfo group; $R_1$ is a hydrogen atom, a $C^1$-$C^3$ alkyl group or a group of the formula, $(C_mH_{(2m-p)+1})$—$(R_9)_p$ (wherein $m$ is an integer of 1–6; $p$ is an integer of 1–2, and $R_9$ is a hydroxyl group or a $C^1$-$C^3$ alkoxy group); $R_2$ is a hydrogen atom or a $C^1$-$C^3$ alkyl group; $R_3$ and $R_4$ are independently a hydrogen atom, a halogen atom, a $C^1$-$C^3$ alkyl group, a $C^1$-$C^3$ alkoxy group, a $C^1$-$C^3$ alkylthio group, a nitro group, a trifluoromethyl group, an amino group or a hydroxyl group; $R_5$ is a hydrogen atom or a methyl group; $R_6$ is a hydrogen atom or a $C^1$-$C^3$ alkyl group; $R_7$ is a hydrogen atom, a $C^1$-$C^3$ alkyl group, a phenyl group or a $C^1$-$C^3$ alkoxyphenyl group; $R_8$ is a hydrogen atom or a hydroxyl group, or $R_7$ and $R_8$ may form a $C^1$-$C^3$ alkylidene group or a carbonyl group together with a carbon atom to which these substituents are bonded; and $n$ is an integer of 2–4, provided that, when $n$ is an integer of 2, $R_1$ and $R_2$ are a methyl group, R is a hydrogen atom or a hydroxyl group and $R_4$, $R_5$, $R_6$, $R_7$ and $R_8$ are hydrogen atoms, $R_3$ must be a halogen atom, a $C^1$-$C^3$ alkyl group, a $C^1$-$C^3$ alkoxy group, a $C^1$-$C^3$ alkylthio group, a nitro group, a trifluoromethyl group, an amino group or a hydroxyl group, which are useful as non-addicting, analgesic and pain-relieving agents with calming effect. These benzomorphan derivatives are prepared by reacting a 6,7-benzomorphan derivative of the formula:

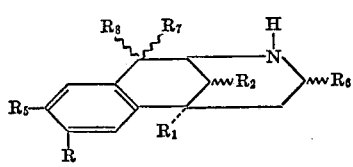

wherein R, $R_1$, $R_2$, $R_5$, $R_6$, $R_7$ and $R_8$ are as defined above, with a halogen derivative of the formula:

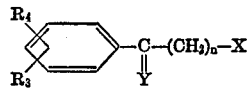

wherein $R_3$, $R_4$ and $n$ are as defined above, X is a halogen atom and Y is an oxygen atom or an ethylenedioxy group, and further, in the case of Y=ethylenedioxy group, by hydrolyzing the resulting ethylenedioxy derivative of the formula:

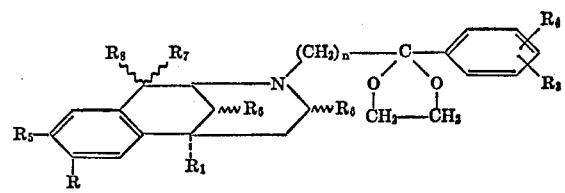

wherein R, $R_1$, $R_2$, $R_3$, $R_4$ $R_5$, $R_6$, $R_7$, $R_8$ and $n$ are as defined above.

CROSS REFERENCE TO RELATED APPLICATION

This application is a continuation-in-part of co-pending application Ser. No. 883,319 filed on Dec. 8, 1969 and now abandoned.

The present invention relates to novel 6,7-benzomorphan derivatives and their salts and production thereof which are useful as non-addicted analgesics and pain-relieving agents with calming effects.

Hitherto, many benzomorphan derivatives have been studied for developing new analgesics (see, for example, Belg. Pat. 611,000 or "Chemistry of the Opium Alkaloids," U.S. Public Health Reports, Suppl. No. 103, Washington (1932)), but almost all of them produce addiction and other morphine-like side effects besides analgesic activity. These analgesics always produce significant physical dependency by administrating orally or subcutaneously. To our surprise, however, the present products do not show any drug dependency in animal tests.

One object of the present invention is to provide these novel benzomorphan derivatives which are useful as non-addicted analgesics.

Another object of the present invention is to provide a process for producing these useful benzomorphan derivatives.

A further object of the present invention is to provide a novel pharmaceutical composition containing these useful benzomorphan derivatives.

Other object and advantages of the present invention will be apparent from the following description.

In order to accomplish these objects, the present invention provides novel benzomorphan derivatives of the formula,

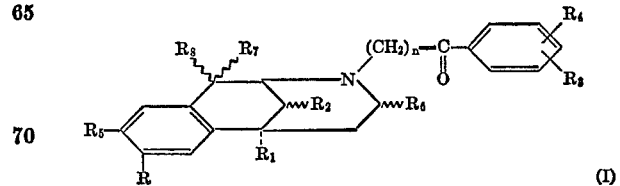

wherein R is a hydrogen atom, a $C^1$–$C^3$ alkoxy group, an acyloxy group, a hydroxyl group, a nitro group, a halogen atom, a cyano group, an amino group, a carboxyl group, a carbamoyl group or a sulfo group; $R_1$ is a hydrogen atom, a $C^1$–$C^3$ alkyl group or a group of the formula, $(C_mH_{(2m-p)+1})$—$(R_9)_p$ (wherein $m$ is an integer of 1–6; $p$ is an integer of 1–2, and $R_9$ is a hydroxyl group or a $C^1$–$C^3$ alkoxy group); $R_2$ is a hydrogen atom or a $C^1$–$C^3$ alkyl group; $R_3$ and $R_4$ are independently a hydrogen atom, a halogen atom, a $C^1$–$C^3$ alkyl group, a $C^1$–$C^3$ alkoxy group, a $C^1$–$C^3$ alkylthio group, a nitro group, a trifluoromethyl group, an amino group or a hydroxyl group; $R_5$ is a hydrogen atom or a methyl group; $R_6$ is a hydrogen atom or a $C^1$–$C^3$ alkyl group; $R_7$ is a hydrogen atom, a $C^1$–$C^3$ alkyl group, a phenyl group or a $C^1$–$C^3$ alkoxyphenyl group; $R_8$ is a hydrogen atom or a hydroxyl group, or $R_7$ and $R_8$ may form a $C^1$–$C^3$ alkylidene group or a carbonyl group together with a carbon atom to which these substituents are bonded; and $n$ is an integer of 2–4, provided that when $n$ is an integer of 2; $R_1$ and $R_2$ are methyl groups; R is a hydrogen atom or a hydroxyl group; $R_4$, $R_5$, $R_6$, $R_7$ and $R_8$ are hydrogen atoms, $R_3$ must be a halogen atom, a $C^1$–$C^3$ alkyl group, a $C^1$–$C^3$ alkoxy group, a $C^1$–$C^3$ alkylthio group, a nitro group, a trifluoromethyl group, an amino group or a hydroxy group.

The present invention further provides a process for producing benzomorphan derivatives of the formula I, which comprises hydrolyzing an ethylenedioxy derivative of the formula:

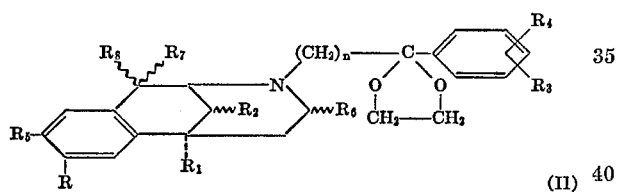

(II)

wherein R, $R_1$, $R_2$, $R_3$, $R_4$, $R_5$, $R_6$, $R_7$, $R_8$ and $n$ are as defined above.

The present invention furthermore provides a process for producing benzomorphan derivatives of the formula (I), which comprises reacting a 6,7-benzomorphan derivative of the formula:

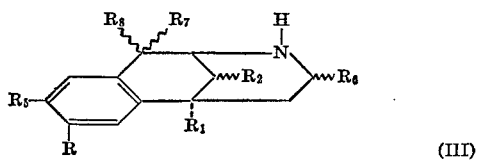

(III)

wherein R, $R_1$, $R_2$, $R_5$, $R_6$, $R_7$ and $R_8$ are as defined above, with a reactive halide of the formula:

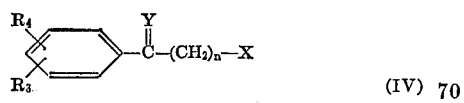

(IV)

wherein $R_3$, $R_4$ and $n$ are as defined above; X is a halogen atom and Y is an oxygen atom or an ethylenedioxy group, and further, in the case of Y=ethylenedioxy, hydrolyzing the resulting ethylenedioxy derivative of the formula (II).

The present invention still further provides novel pharmaceutical composition consisting of an analgesically effective amount of a benzomorphan derivative of the formula (I) as active ingredient and pharmaceutically acceptable carrier or diluent.

The starting materials of this invention, 6,7-benzomorphan derivatives of the formula (III) are prepared from the corresponding 2-methyl - 6,7 - benzomorphan derivatives by demethylation. Thus, for example, U.S. Patent Specification No. 3,138,603 discloses a process shown by the following scheme.

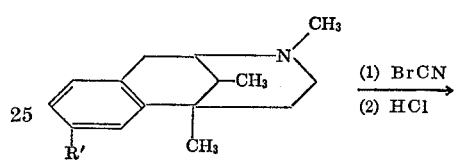

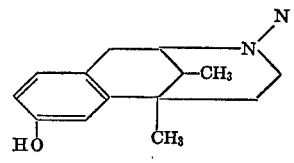

wherein R' is methoxy group or acetoxy group.

Further, several processes have heretofore been described for the production of 2-methyl - 6,7 - benzomorphan derivatives represented by the general formula:

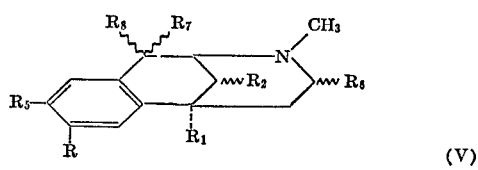

(V)

wherein R is a hydrogen atom, a methoxy group, a hydroxyl group, an acetoxy group, a nitro group, an amino group or a halogen atom; $R_1$ is a hydrogen atom, a lower alkyl group, an alkoxy or hydroxyalkyl group; $R_2$ is a hydrogen atom or a lower alkyl group; $R_5$ is a hydrogen atom or a methyl group; $R_6$ is a hydrogen atom or an alkyl group; $R_7$ is a hydrogen atom, a methyl group or a phenyl group; and $R_8$ is a hydrogen atom or a hydroxyl group or $R_7$ and $R_8$ may form carbonyl group or a methylene group together with a carbon atom to which these substituents are bonded, as shown in scheme 1 and scheme 2.

One main process is, for example, as follows:

Scheme 1

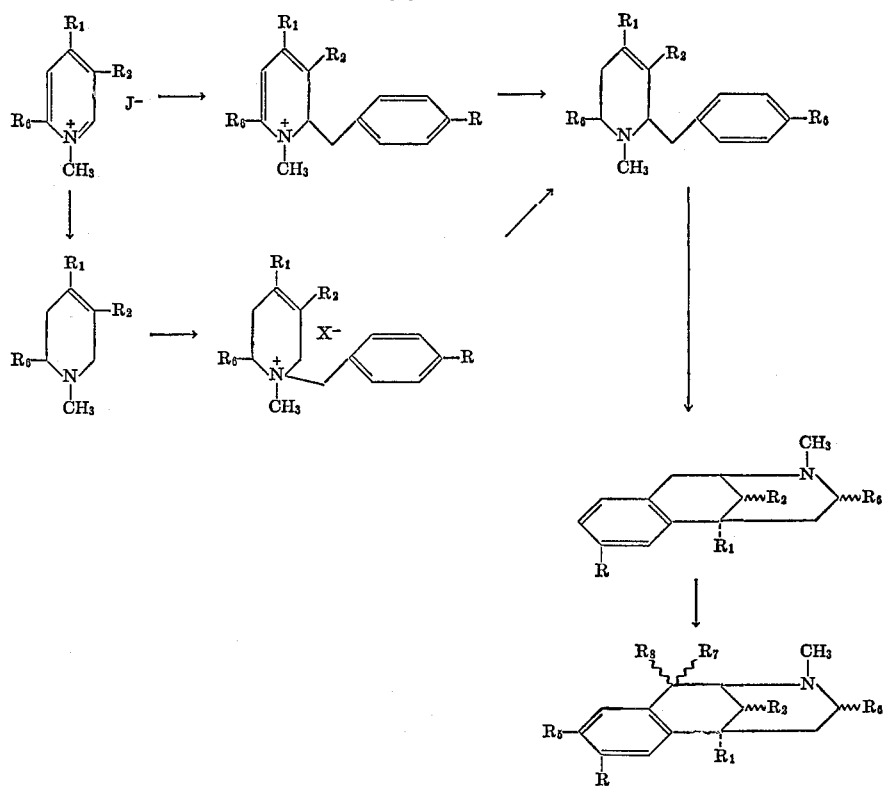

wherein R, $R_1$, $R_2$, $R_5$, $R_6$, $R_7$ and $R_8$ are as defined above and X is a halogen atom, and another process is described as follows:

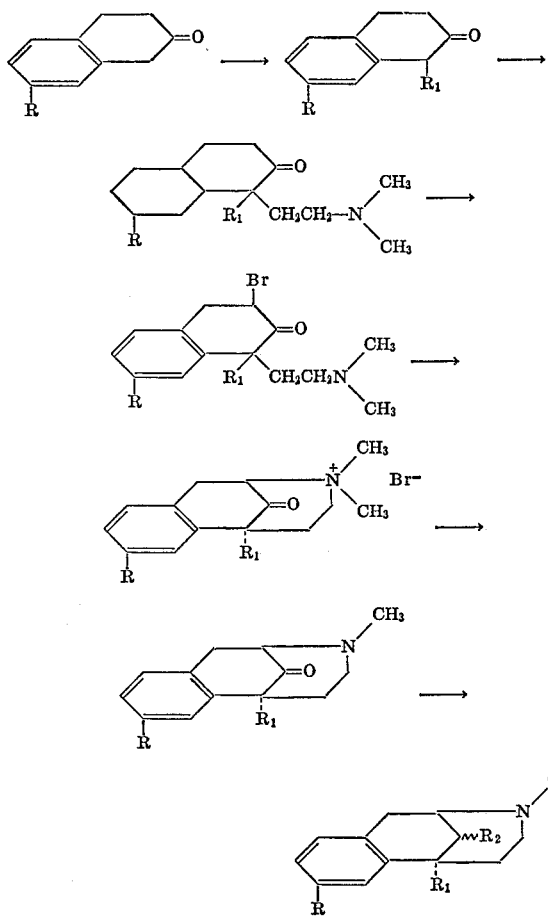

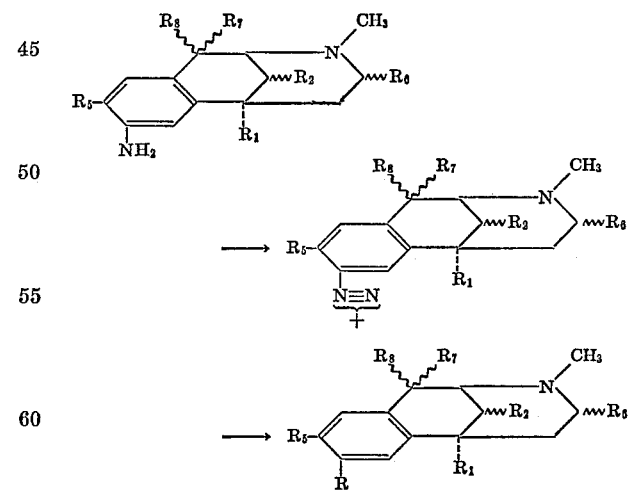

wherein R is a hydrogen atom, a methoxy group or a hydroxy group; $R_1$ is a hydrogen atom of a methyl group; and $R_2$ is a hydrogen atom or a methyl group.

Further, when R is a cyano group, a carboxyl group, a carbamoyl group or a sulfo group, such 2-methyl-6,7-benzomorphan derivatives [V] are prepared from the corresponding 2'-amino-derivatives via diazonium derivatives as follows:

wherein R is a cyano group, a carboxyl group, a carbamoyl group or a sulfo group; and $R_1$, $R_2$, $R_5$, $R_6$, $R_7$ and $R_8$ are as defined above.

The reaction of a 6,7-benzomorphan derivative [III] with a reactive halide [IV] is usually accomplished in an organic inert solvent, for example, n-hexane, benzene, toluene, xylene, chloroform, dimethylformamide, methanol, ethanol, isopropylalcohol, and the like. The reaction is preferably carried out in the presence of a base, for example, sodium carbonate, potassium carbonate, sodium bicarbonate, potassium bicarbonate, sodium hydroxide, potassium hydroxide, sodium amide, sodium hydride, pyridine and triethylamine. The reaction proceeds at a temperature of 20° to 200° C., preferably 60° to 150° C. The reaction product may be readily recovered from the reaction mixture by filtration at the existing concentration and addition of water and/or any other solvent in which the filtrate is insoluble or slightly soluble.

According to the above process, when 2-methyl-6,7-benzomorphan derivatives [V] obtained by the process of (i) U.S. Pat. No. 3,138,603 are used as the starting material in the present invention, the following 6,7-benzomorphan derivatives are obtained,

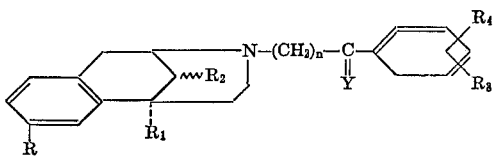

wherein R is a hydrogen atom, a hydroxyl group, a $C^1$–$C^3$ alkoxy group or an acyloxy group; $R_1$ and $R_2$ are independently $C^1$–$C^3$ alkyl groups; $R_3$, $R_4$ and $n$ are as defined above; and Y is an oxygen atom or an ethylenedioxy group.

2'-Hydroxy-2-[4''-(p-fluorophenyl)-4'',4''-ethylenedioxy-n-butyl]-5,9-dimethyl-6,7-benzomorphan
2'-Hydroxy-2-[4''(p-methoxyphenyl)-4'',4''-ethylenedioxy-n-butyl]-5,9-dimethyl-6,7-benzomorphan
2'-Hydroxy-2-[4''-(p-methylphenyl)-4'',4''-ethylenedioxy-n-butyl]-5-methyl-9-ethyl-6,7-benzomorphan
2'-Hydroxy-2-[5''-(p-fluorophenyl)-5'',5''-ethylenedioxy-n-pentyl]-5,9-dimethyl-6,7-benzomorphan
2'-Hydroxy-2-[4''-(2,5-dimethylphenyl)-4'',4''-ethylenedioxy-n-butyl]-5,9-dimethyl-6,7-benzomorphan
2-[4''-(p-chlorophenyl)-4'',4''-ethylenedioxy-n-butyl]-5,9-dimethyl-6,7-benzomorphan
2'-Hydroxy-2-[4''-(m-trifluoromethylphenyl)-4'',4''-ethylenedioxy-n-butyl]-5-methyl-9-ethyl-6,7-benzomorphan
2'-Methoxy-2-[4''-(p-fluorophenyl)-4'',4''-ethylenedioxy-n-butyl]-5,9-dimethyl-6,7-benzomorphan
2'-Hydroxy-2-[4''-(2,3-dimethoxyphenyl)-4'',4''-ethylenedioxy-n-butyl]-5,9-dimethyl-6,7-benzomorphan
2'-Hydroxy-2-[4''-(p-methylthiophenyl)-4'',4''-ethylenedioxy-n-butyl]-5,9-dimethyl-6,7-benzomorphan
2'-Hydroxy-2-[4''-(m-nitrophenyl)-4'',4''-ethylenedioxy-n-butyl]-5,9-dimethyl-6,7-benzomorphan
2'-Hydroxy-2-[4''-(p-hydroxyphenyl)-4'',4''-ethylenedioxy-n-butyl]-5,9-dimethyl-6,7-benzomorphan
2'-Hydroxy-2-[4''-(m-aminophenyl)-4'',4''-ethylenedioxy-n-butyl]-5,9-dimethyl-6,7-benzomorphan
2'-Hydroxy-2-(γ-benzoyl-n-propyl)-5-methyl-9-ethyl-6,7-benzomorphan
2'-Hydroxy-2-(γ-benzoyl-n-propyl)-5,9-dimethyl-6,7-benzomorphan
2-(γ-Benzoyl-n-propyl)-5,9-dimethyl-6,7-benzomorphan
2'-Hydroxy-2-[γ-(p-methoxybenzoyl)-n-propyl]-5,9-dimethyl-6,7-benzomorphan
2'-Hydroxy-2-[γ-(p-chlorobenzoyl)-n-propyl]-5,9-dimethyl-6,7-benzomorphan
2'-Hydroxy-2-[γ-(p-methylbenzoyl)-n-propyl]-5,9-dimethyl-6,7-benzomorphan
2'-Hydroxy-2-(γ-benzoyl-n-butyl)-5,9-dimethyl-6,7-benzomorphan
2'-Hydroxy-2-[3''-(2,5-dimethylphenyl)-3'',3''-ethylenedioxy-n-propyl]-5,9-dimethyl-6,7-benzomorphan
2'-Hydroxy-2-[3''-(3,4-dimethoxyphenyl)-3'',3''-ethylenedioxy-n-propyl]-5,9-dimethyl-6,7-benzomorphan
2'-Hydroxy-2-[3''-(2-fluoro-4-methylphenyl)-3'',3''-ethylenedioxy-n-propyl]-5,9-dimethyl-6,7-benzomorphan
2'-Hydroxy-2-[3''-(p-fluorophenyl)-3'',3''-ethylenedioxy-n-propyl]-5,9-dimethyl-6,7-benzomorphan
2'-Hydroxy-2-(β-benzoylethyl)-5,9-dimethyl-6,7-benzomorphan
2-[3''-(p-Fluorophenyl)-3'',3''-ethylenedioxy-n-propyl]-5,9-dimethyl-6,7-benzomorphan
2'-Hydroxy-2-[3''-(p-fluorophenyl)-3'',3''-ethylenedioxy-n-propyl]-5,9-diethyl-6,7-benzomorphan
2'-Hydroxy-2-[3''-(m-fluorophenyl)-3'',3''-ethylenedioxy-n-propyl]-5,9-dimethyl-6,7-benzomorphan
2'-Hydroxy-2-[3''-(p-trifluoromethylphenyl)-3'',3''-ethylenedioxy-n-propyl]-5,9-dimethyl-6,7-benzomorphan
2'-Hydroxy-2-[3''-(p-chlorophenyl)-3'',3''-ethylenedioxy-n-propyl]-5,9-dimethyl-6,7-benzomorphan
2'-Hydroxy-2-[3''-(p-methoxyphenyl)-3'',3''-ethylenedioxy-n-propyl]-5,9-dimethyl-6,7-benzomorphan
2'-Hydroxy-2-[3''-(p-methylphenyl)-3'',3''-ethylenedioxy-n-propyl]-5-methyl-9-ethyl-6,7-benzomorphan
2'-Methoxy-2-[3''-(p-fluorophenyl)-3'',3''-ethylenedioxy-n-propyl]-5,9-dimethyl-6,7-benzomorphan Similarly, according to the above process, when 2-methyl-6,7-benzomorphan derivative [V] obtained by the process of (ii) Everret L. May (Journal of Organic Chemistry, 22, 1370 (1957)) are used as the starting material in the present invention, the following 6,7-benzomorphan derivatives are obtained.

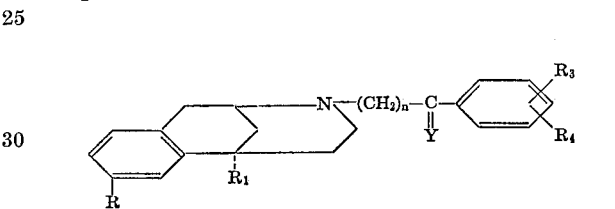

wherein R is a hydrogen atom, a hydroxyl group, a $C^1$–$C^3$ alkoxy group or an acyloxy group; $R_1$ is a $C^1$–$C^3$ alkyl group; and $R_3$, $R_4$, Y and $n$ are as defined above.

2'-Hydroxy-2-[4''-(p-fluorophenyl)-4'',4''-ethylenedioxy-n-butyl]-5-methyl-6,7-benzomorphan
2'-Hydroxy-2-(γ-benzoyl-n-propyl)-5-methyl-6,7-benzomorphan
2'-Hydroxy-2-[4''-(p-fluorophenyl)-4'',4''-ethylenedioxy-n-butyl]-5-ethyl-6,7-benzomorphan
2'-Hydroxy-2-[4''-(p-methoxyphenyl)-4'',4''-ethylenedioxy-n-butyl]-5-methyl-6,7-benzomorphan
2-(β-Benzoylethyl)-5-methyl-6,7-benzomorphan
2-[3''-(p-Methoxyphenyl)-3'',3''-ethylenedioxy-n-propyl]-5-methyl-6,7-benzomorphan
2'-Hydroxy-2-[4''-(m-fluorophenyl)-4'',4''-ethylenedioxy-n-butyl]-5-methyl-6,7-benzomorphan
2'-Hydroxy-2-[4''-(p-methylphenyl)-4'',4''-ethylenedioxy-n-butyl]-5-ethyl-6,7-benzomorphan
2-[4''-(p-Fluorophenyl)-4'',4''-ethylenedioxy-n-butyl]-5-methyl-6,7-benzomorphan
2'-Methoxy-2-[4''-(p-chlorophenyl)-4'',4''-ethylenedioxy-n-butyl]-5-methyl-6,7-benzomorphan
2'-Hydroxy-2-[5''-(3,4-dimethoxyphenyl)-5'',5''-ethylenedioxy-n-pentyl]-5-methyl-6,7-benzomorphan
2'-Hydroxy-2-[4''-(p-trifluoromethylphenyl)-4'',4''-ethylenedioxy-n-butyl]-5-methyl-6,7-benzomorphan
2'-Hydroxy-2-[3''-(p-fluorophenyl)-3'',3''-ethylenedioxy-n-propyl]-5-methyl-6,7-benzomorphan
2-[3''-(p-Fluorophenyl)-3'',3''-ethylenedioxy-n-propyl]-5-methyl-6,7-benzomorphan
2'-Hydroxy-2-(β-benzoylethyl)-5-methyl-6,7-benzomorphan
2'-Hydroxy-2-[3''-(p-methoxyphenyl)-3'',3''-ethylenedioxy-n-propyl]-5-methyl-6,7-benzomorphan Moreover, according to the above process, when 2-methyl-6,7-benzomorphan derivative [V] obtained by the process of (iii) Everret L. May (Journal of Medicinal Chemistry, 12, 405 (1969)) are used as the starting material in the present invention, the following 6,7-benzomorphan derivatives are obtained,

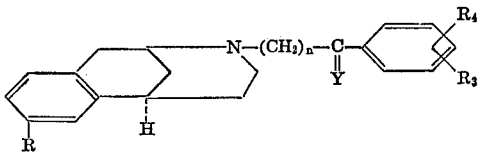

wherein R is a hydrogen atom, a hydroxyl group, an acyloxy group or a $C^1$–$C^3$ alkoxy group; and $R_3$, $R_4$, $n$ and Y are as defined above.

2'-Hydroxy-2-[4''-(p-fluorophenyl)-4'',4''-ethylenedioxy-n-butyl]-6,7-benzomorphan
2'-Hydroxy-2-[4''-(p-methoxyphenyl)-4'',4''-ethylenedioxy-n-butyl]-6,7-benzomorphan
2'-Hydroxy-2-(γ-benzoyl-n-propyl)-6,7-benzomorphan
2'-Hydroxy-2-[4''-(m-fluorophenyl)-4'',4''-ethylenedioxy-n-butyl]-6,7-benzomorphan
2'-Hydroxy-2-[4''-(p-methylphenyl)-4'',4''-ethylenedioxy-n-butyl]-6,7-benzomorphan
2-[4''-(p-fluorophenyl)-4'',4''-ethylenedioxy-n-butyl]-6,7-benzomorphan
2'-Methoxy-2-[4''-(p-chlorophenyl)-4'',4''-ethylenedioxy-n-butyl]-6,7-benzomorphan
2'-Hydroxy-2-[5''-(3,4-dimethoxyphenyl)-5'',5''-ethylenedioxy-n-pentyl]-6,7-benzomorphan
2'-Hydroxy-2-[4''-(p-trifluoromethylphenyl)-4'',4''-ethylenedioxy-n-butyl]-6,7-benzomorphan
2'-Hydroxy-2-[4''-(3,4-dimethoxyphenyl)-4'',4''-ethylenedioxy-n-butyl]-6,7-benzomorphan
2-(γ-Benzoyl-n-propyl)-6,7,-benzomorphan
2-[4''-(p-Methoxyphenyl)-4'',4''-ethylenedioxy-n-butyl]-6,7-benzomorphan
2'-Hydroxy-2-[3''-(p-fluorophenyl)-3'',3''-ethylenedioxy-n-propyl]-6,7-benzomorphan
2-[3''-(p-Fluorophenyl)-3'',3''-ethylenedioxy-n-propyl]-6,7-benzomorphan
2'-Hydroxy-2-[3''-(p-methoxyphenyl)-3'',3''-ethylenedioxy-n-propyl]-6,7-benzomorphan
2-[3''-(p-Methoxyphenyl)-3'',3''-ethylenedioxy-n-propyl]-6,7-benzomorphan
2'-Hydroxy-2-[3''-(3,4-dimethoxyphenyl)-3'',3''-ethylenedioxy-n-propyl]-6,7-benzomorphan
2'-Hydroxy-2-(β-benzoylethyl)-6,7-benzomorphan
2-(β-Benzoylethyl)-6,7-benzomorphan
2'-Hydroxy-2-[3''-m-fluorophenyl)-3'',3''-ethylenedioxy-n-propyl]-6,7-benzomorphan Moreover, according to the above process, when 2-methyl-6,7-benzomorphan derivative [V] obtained by the process of (iv) U.S. Pat. No. 3,480,638 are used as the starting material in the present invention, the following 6,7-benzomorphan derivatives are obtained,

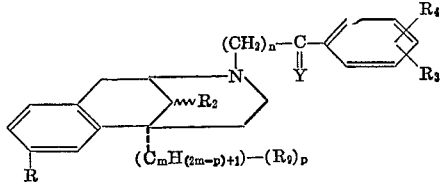

wherein R is a hydrogen atom, a hydroxy group, a $C^1$–$C^3$ alkoxy group or an acyloxy group and $R_2$, $R_3$, $R_4$, $R_9$, $n$, $m$, Y and $p$ are as defined above.

2'-Methoxy-2-[4''-(p-fluorophenyl)-4'',4''-ethylenedioxy-1''-butyl]-5-(β-methoxyethyl)-6,7-benzomorphan
2'-Methoxy-2-(γ-benzoyl-n-propyl)-5-(β-methoxyethyl)-6,7-benzomorphan
2-[4''-(p-Fluorophenyl)-4'',4''-ethylenedioxy-1''-butyl]-5-(β-methoxyethyl)-6,7-benzomorphan
2'-Hydroxy-2-[4''-(p-fluorophenyl)-4'',4''-ethylenedioxy-1''-butyl]-5-(β-hydroxyethyl)-6,7-benzomorphan
2'-Methoxy-2-[5''-(p-methylphenyl)-5'',5''-ethylenedioxy-1''-pentyl]-5-(β-methoxyethyl)-6,7-benzomorphan
2-Methoxy-2-[4''-(p-methoxyphenyl)-4'',4''-ethylenedioxy-1''-butyl]-5-(β-methoxyethyl)-6,7-benzomorphan
2-[γ-Benzoyl-n-propyl)-5-(β-methoxyethyl)-6,7-benzomorphan
2-[4''(3,4-Dimethoxyphenyl)-4'',4''-ethylenedioxy-1''-butyl]-5-(β-ethoxyethyl)-6,7-benzomorphan
2'-Methoxy-2-[4''-(m-fluorophenyl)-4'',4''-ethylenedioxy-1''-butyl]-5-(β-methoxyethyl)-6,7-benzomorphan
2'-Methoxy-2-[3''-(p-fluorophenyl)-3'',3''-ethylenedioxy-1''-propyl]-5-(β-methoxyethyl)-6,7-benzomorphan
2'-Hydroxy-2-[3''-(p-fluorophenyl)-3'',3''-ethylenedioxy-1''-propyl]-5-(β-hydroxyethyl)-6,7-benzomorphan
2-[3''-(p-Fluorophenyl)-3'',3''-ethylenedioxy-1''-propyl]-5-(β-methoxyethyl)-6,7-benzomorphan
2'-Methoxy-2-(γ-benzoylethyl)-5-(β-methoxyethyl)-6,7-benzomorphan
2-(γ-Benzoylethyl)-5-(β-methoxyethyl)-6,7-benzomorphan
2'-Methoxy-2-[3''-(p-methoxyphenyl)-3'',3''-ethylenedioxy-1''-propyl]-5-(β-ethoxyethyl)-6,7-benzomorphan Moreover, according to the process of (v) Everret L. May (Journal of Medicinal Chemistry, 8, 563 (1965)), the thus obtained 2'-amino-6,7-benzomorphan derivatives are converted by the process of the present invention to 2'-cyano, -carboxyl, -carbamoyl, -sulfo-6,7-benzomorphan derivatives via the diazonium derivatives. Thus, the following 6,7-benzomorphan derivatives are obtained,

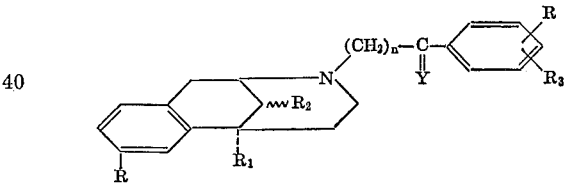

wherein R is a nitro group, a halogen atom, a cyano group, an amino group, a carboxyl group, a carbamoyl group or a sulfo group; and $R_1$, $R_2$, $R_3$, $R_4$, $n$ and Y are as defined above.

2'-Nitro-2-[4''-(p-fluorophenyl)-4'',4''-ethylenedioxy-1''-butyl]-5,9-dimethyl-6,7-benzomorphan
2'-Amino-2-[4''-(p-fluorophenyl)-4'',4''-ethylenedioxy-1''-butyl]-5,9-dimethyl-6,7-benzomorphan
2'-Chloro-2-[4''-(p-methoxyphenyl)-4'',4''-ethylenedioxy-1''-butyl]-5,9-dimethyl-6,7-benzomorphan
2'-Nitro-2-[4''(p-fluorophenyl)-4'',4''-ethylenedioxy-1''-butyl]-5-methyl-6,7-benzomorphan
2'-Nitro-2-[4''-(p-fluorophenyl)-4'',4''-ethylenedioxy-1''-butyl]-6,7-benzomorphan
2'-Amino-2-[4''-(p-fluorophenyl)-4'',4''-ethylenedioxy-1''-butyl]-5-methyl-6,7-benzomorphan
2'-Amino-2-[4''-(p-fluorophenyl)-4'',4''-ethylenedioxy-1''-butyl]-6,7-benzomorphan
2'-Nitro-2-[4''-(p-fluorophenyl)-4'',4''-ethylenedioxy-1''-butyl]-9-methyl-6,7-benzomorphan
2'-Amino-2-[4''-(p-fluorophenyl)-4'',4''-ethylenedioxy-1''-butyl]-9-methyl-6,7-benzomorphan
2'-Nitro-2-[4''-(p-methoxyphenyl)-4'',4''-ethylenedioxy-1''-butyl]-6,7-benzomorphan
2'-Nitro-2-[3''-(p-fluorophenyl)-3'',3''-ethylenedioxy-1''-propyl]-5,9-dimethyl-6,7-benzomorphan
2'-Nitro-2-(γ-benzoylethyl)-6,7-benzomorphan
2'-Chloro-2-[4''-(β-methoxyphenyl)-4'',4''-ethylenedioxy-1''-butyl]-5-(β-methoxyethyl)-6,7-benzomorphan 2'-Fluoro-2-[4"-(p-fluorophenyl)-4",4"-ethylenedioxy-1"-butyl]-5,9-dimethyl-6,7-benzomorphan 2'-Nitro-2-[3"-(p-fluorophenyl)-3",3"-ethylenedioxy-1"-propyl]-6,7-benzomorphan Moreover, according to the above process, when 2-methyl-6,7-benzomorphan derivatives [V] obtained by the process of (vi) Deutsche Offenlegungsschrift 2002864, and (vii) Albert Ziering (Journal of Medicinal Chemistry, 13, 9 (1970)) are used as the starting material in the present invention, the following 6,7-benzomorphan derivatives are obtained,

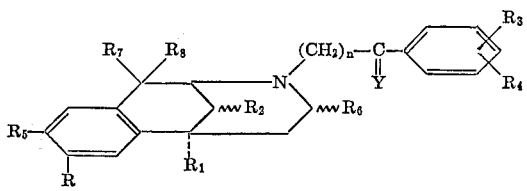

wherein R is a hydrogen atom, a $C^1$–$C^3$ alkoxy group, a hydroxyl group or an acyloxy group; and $R_1$, $R_2$, $R_3$, $R_4$, $R_5$, $R_6$, $R_7$, $R_8$, $n$ and Y are as defined above.

2-[4"-(p-Fluorophenyl)-4",4"-ethylenedioxy-1"-butyl]-5,8,9-trimethyl-6,7-benzomorphan 2'-Hydroxy-2-[4"-(p-fluorophenyl)-4",4"-ethylenedioxy-1"-butyl]-5,8,9-trimethyl-6,7-benzomorphan 2'-Hydroxy-2-[4"-(p-fluorophenyl)-4",4"-ethylenedioxy-1"-butyl]-5,8-dimethyl-6,7-benzomorphan 2'-Hydroxy-2-[4"(p-fluorophenyl)-4",4"-ethylenedioxy-1"-butyl]-8-methyl-6,7-benzomorphan 2'-Hydroxy-2-[3"-(p-fluorophenyl)-3",3"-ethylenedioxy-1"-propyl]-5,8,9-trimethyl-6,7-benzomorphan 2'-Hydroxy-3'-methyl-2-[4"-(p-fluorophenyl)-4",4"-ethylenedioxy-1"-butyl]-5,9-dimethyl-6,7-benzomorphan 2'-Hydroxy-2-[4"-(p-methoxyphenyl)-4",4"-ethylenedioxy-1"-butyl]-3,5-dimethyl-6,7-benzomorphan 2'-Hydroxy-2-[4"-(p-fluorophenyl)-4",4"-ethylenedioxy-1"-butyl]-5-methyl-8-oxo-6,7-benzomorphan 2'-Hydroxy-2-[4"-(p-fluorophenyl)-4",4"-ethylenedioxy-1"-butyl]-5,9-dimethyl-8-methylene-6,7-benzomorphan 2'-Hydroxy-2-(γ-benzoyl-n-propyl)-5,8,9-trimethyl-6,7-benzomorphan 2'-Hydroxy-2-[4"-(p-fluorophenyl)-4",4"-ethylenedioxy-1"-butyl]-3,5-dimethyl-6,7-benzomorphan 2'-Hydroxy-3'-methyl-2-[4"-(p-fluorophenyl)-4",4"-ethylenedioxy-1"-butyl]-6,7-benzomorphan 2'-Hydroxy-2-[4"-(3,4-dimethoxyphenyl)-4",4"-ethylenedioxy-1"-butyl]-5,8,9-trimethyl-6,7-benzomorphan 2'-Hydroxy-2-[3"-(p-methoxyphenyl)-3",3"-ethylenedioxy-1"-propyl]-5,8,9-trimethyl-6,7-benzomorphan Moreover, according to the above process, when 2-methyl - 6,7 - benzomorphan derivative [V] obtained by the process of (viii) Everret L. May (Journal of Organic Chemistry, 25, 1386 (1960)) are used as the starting material in the present invention, the following 6,7-benzomorphan derivatives are obtained,

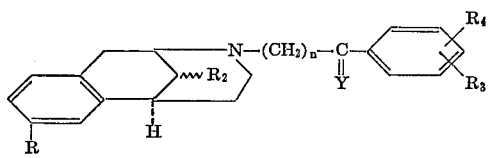

wherein R is a hydrogen atom, a hydroxyl group, a $C^1$–$C^3$ alkoxy group or an acyloxy group; $R_2$ is a $C^1$–$C^3$ alkyl group; and $R_3$, $R_4$, Y and $n$ are as defined above.

2'-Hydroxy-2-[4"-(p-fluorophenyl)-4"-4"-ethylenedioxy-1"-butyl]-9-methyl-6,7-benzomorphan 2'-Hydroxy-2-[4"-(m-fluorophenyl)-4",4"-ethylenedioxy-1"-butyl]-9-methyl-6,7-benzomorphan 2'-Hydroxy-2-[5"-(p-fluorophenyl)-5",5"-ethylenedioxy-1"-pentyl]-9-methyl-6,7-benzomorphan 2'-Hydroxy-2-[4"-(p-trifluoromethylphenyl)-4",4"-ethylenedioxy-1"-butyl]-9-methyl-6,7-benzomorphan 2'-Hydroxy-2-(γ-benzoyl-n-propyl)-9-methyl-6,7-benzomorphan 2'-Hydroxy-2-[4"-(p-methoxyphenyl)-4",4"-ethylenedioxy-1"-butyl]-9-methyl-6,7-benzomorphan 2-[4"-(p-Fluorophenyl)-4",4"-ethylenedioxy-1"-butyl]-9-methyl-6,7-benzomorphan 2-[4"-(p-Methoxyphenyl)-4",4"-ethylenedioxy-1"-butyl]-9-methyl-6,7-benzomorphan 2-(γ-Benzoyl-n-propyl)-9-methyl-6,7-benzomorphan 2'-Hydroxy-2-[3"-(p-fluorophenyl)-3",3"-ethylenedioxy-1"-propyl]-9-methyl-6,7-benzomorphan 2-[3"-(p-Fluorophenyl)-3",3"-ethylenedioxy-1"-propyl]-9-methyl-6,7-benzomorphan 2'-Hydroxy-2-[3"-(p-methoxyphenyl)-3",3"-ethylenedioxy-1"-propyl]-9-methyl-6,7-benzomorphan 2-[3"-(p-Methoxyphenyl)-3",3"-ethylenedioxy-1"-propyl]-9-methyl-6,7-benzomorphan 2'-Hydroxy-2-(β-benzoylethyl)-9-methyl-6,7-benzomorphan 2'-Hydroxy-2-[4"-(3,4-dimethoxyphenyl)-4",4"-ethylenedioxy-1"-butyl]-9-methyl-6,7-benzomorphan In the present invention, an ethylenedioxy derivative [II] mentioned above is converted to a desired 6,7-benzomorphan derivative [I] by hydrolyzing in the presence of an acid.

The hydrolysis of the said ethylenedioxy derivative [II] is carried out in a suitable solvent, for example, water, an alcohol such as methanol, ethanol, n- or iso-propanol, n-butanol and the like, preferably at a temperature ranging from room temperature to the boiling point of the solvent used. In this reaction employment of a catalytic amount of acid is necessary, examples of which include mineral acids such as hydrochloric acid, sulfuric acid and phosphoric acid, and acetic acid and the like. The reaction is usually completed after 0.5 to 2 hours.

When 2-substituted 6,7-benzomorphan derivative of the formula [I] (R is an acyloxy group) is desired, the purpose is easily performed by acylating the compound of the formula [I] (R is a hydroxyl group) with an acid anhydride or an acyl halide.

The thus prepared 6,7-benzomorphan derivative [I] may be converted into its acid-addition salt by conventional procedures, e.g. treatment with an organic or inorganic acids such as formic acid, acetic acid, butyric acid, malic acid, fumaric acid, succinic acid, glutamic acid, tartaric acid, oxalic acid, citric acid, lactic acid, glycolic acid, gluconic acid, glucuronic acid, saccharic acid, ascorbic acid, benzoic acid, phthalic acid, salicylic acid, glyceric acid, anthranilic acid, cholic acid, picolinic acid, picric acid, tropic acid, indoleacetic acid, barbituric acid, sulfamic acid, methanesulfonic acid, ethanesulfonic acid, benzenesulfonic acid, p-toluenesulfonic acid, hydrochloric acid, hydrobromic acid, hydroiodic acid, sulfuric acid, phosphoric acid and the like.

According to the process of the present invention, there are produced such 6,7-benzomorphan derivatives as shown below.

2'-Hydroxy-2-[γ-(p-fluorobenzoyl)-n-propyl]-5,9-dimethyl-6,7-benzomorphan

2'-Hydroxy-2-[γ-p-fluorobenzoyl)-n-propyl]-5,9-dimethyl-6,7-benzomorphan

2'-Hydroxy-2-[γ-(m-fluorobenzoyl)-n-propyl]-5,9-dimethyl-6,7-benzomorphan

2'-Hydroxy-2-[γ-(p-fluorophenyl)-n-butyl]-5,9-dimethyl-6,7-benzomorphan

2'-Hydroxy-2-[γ-(p-trifluoromethylbenzoyl)-n-propyl]-5,9-dimethyl-6,7-benzomorphan 2'-Hydroxy-2-[γ-(m-trifluoromethylbenzoyl)-n-propyl]-5-methyl-9-ethyl-6,7-benzomorphan 2′-Hydroxy-2-[γ-(p-chlorobenzoyl)-n-propyl]-5,9-dimethyl-6,7-benzomorphan
2-[γ-(p-Fluorobenzoyl)-n-propyl]-5,9-dimethyl-6,7-benzomorphan
2′-Hydroxy-2-[γ-(p-methoxybenzoyl)-n-propyl]-5,9-dimethyl-6,7-benzomorphan
2′-Hydroxy-2-[γ-(p-methoxybenzoyl)-n-butyl]-5,9-dimethyl-6,7-benzomorphan
2′-Hydroxy-2-[γ-(p-methoxybenzoyl)-n-propyl]-5-methyl-9-ethyl-6,7-benzomorphan
2′-Hydroxy-2-[γ-(p-methylbenzoyl)-n-propyl]-5,9-dimethyl-6,7-benzomorphan
2′-Hydroxy-2-[γ-(2,5-dimethylbenzoyl)-n-propyl]-5-methyl-9-ethyl-6,7-benzomorphan
2′-Hydroxy-2-[γ-(2,4-dimethylbenzoyl)-n-propyl]-5,9-dimethyl-6,7-benzomorphan
2′-Hydroxy-2-(γ-benzoyl-n-propyl)-5,9-dimethyl-6,7-benzomorphan
2′-Hydroxy-2-[γ-(p-methylthiobenzoyl)-n-propyl]-5,9-dimethyl-6,7-benzomorphan
2′-Hydroxy-2-[γ-(m-nitrobenzoyl)-n-propyl]-5-methyl-9-ethyl-6,7-benzomorphan
2′-Hydroxy-2-[γ-(p-hydroxybenzoyl-n-propyl]-5,9-diethyl-6,7-benzomorphan
2′-Hydroxy-2-[γ-(3-fluoro-4-methylbenzoyl)-n-propyl]-5,9-dimethyl-6,7-benzomorphan
2′-Methoxy-2-[γ-(p-fluorobenzoyl)-n-propyl]-5,9-dimethyl-6,7-benzomorphan
2′-Hydroxy-2-[γ-(m-aminobenzoyl)-n-propyl]-5,9-dimethyl-6,7-benzomorphan
2′-Hydroxy-2-[β-(3,4-dimethoxybenzoyl)ethyl]-5,9-dimethyl-6,7-benzomorphan
2′-Hydroxy-2-[β-(2,5-dimethylbenzoyl)ethyl]-5,9-dimethyl-6,7-benzomorphan
2′-Hydroxy-2-[β-(3-fluoro-4-methylbenzoyl)ethyl]-5,9-dimethyl-6,7-benzomorphan
2′-Hydroxy-2-[β-(p-fluorobenzoyl)ethyl]-5,9-dimethyl-6,7-benzomorphan
2-[β-(p-Fluorobenzoyl)ethyl]-5,9-dimethyl-6,7-benzomorphan
2′-Hydroxy-2-[β-(p-fluorobenzoyl)ethyl]-5,9-diethyl-6,7-benzomorphan
2′-Hydroxy-2-[β-(m-fluorobenzoyl)ethyl]-5,9-dimethyl-6,7-benzomorphan
2′-Hydroxy-2-[β-(p-trifluoromethylbenzoyl)ethyl]-5,9-dimethyl-6,7-benzomorphan
2′-Hydroxy-2-[β-(p-chlorobenzoyl)ethyl]-5,9-dimethyl-6,7-benzomorphan
2′-Hydroxy-2-[β-(p-methoxybenzoyl)ethyl]-5,9-dimethyl-6,7-benzomorphan
2′-Hydroxy-2-[β-(p-methylbenzoyl)ethyl]-5-methyl-9-ethyl-6,7-benzomorphan
2′-Methoxy-2-[β-(p-fluorobenzoyl)ethyl]-5,9-dimethyl-6,7-benzomorphan
2′-Hydroxy-2-[γ-(p-fluorobenzoyl)-n-propyl]-5-methyl-6,7-benzomorphan
2′-Hydroxy-2-[γ-(p-fluorobenzoyl)-n-propyl]-5-ethyl-6,7-benzomorphan
2′-Hydroxy-2-[γ-(p-methoxybenzoyl)-n-propyl]-5-methyl-6,7-benzomorphan
2′-Hydroxy-2-[γ-(m-fluorobenzoyl)-n-propyl]-5-methyl-6,7-benzomorphan
2′-Hydroxy-2-[γ-(p-methylbenzoyl)-n-propyl]-5-ethyl-6,7-benzomorphan
2-[γ-(p-Fluorobenzoyl)-n-propyl]-5-methyl-6,7-benzomorphan
2′-Methoxy-2-[γ-(p-chlorobenzoyl)-n-propyl]-5-methyl-6,7-benzomorphan
2′-Hydroxy-2-[γ-(3,4-dimethoxybenzoyl)-n-propyl]-5-methyl-6,7-benzomorphan
2′-Hydroxy-2-[γ-(p-trifluoromethylbenzoyl)-n-propyl]-5-methyl-6,7-benzomorphan
2′-Hydroxy-2-[β-(p-fluorobenzoyl)ethyl]-5-methyl-6,7-benzomorphan
2-[β-(p-Fluorobenzoyl)ethyl]-5-methyl-6,7-benzomorphan
2′-Hydroxy-2-[β-(p-methoxybenzoyl)ethyl]-5-methyl-6,7-benzomorphan
2-[β-(p-Methoxybenzoyl)ethyl]-5-methyl-6,7-benzomorphan
2′-Hydroxy-2-[γ-(p-fluorobenzoyl)-n-propyl-6,7-benzomorphan
2′-Hydroxy-2-[γ-(p-methoxybenzoyl)-n-propyl]-6,7-benzomorphan
2′-Hydroxy-2-[γ-(m-fluorobenzoyl)-n-propyl]-6,7-benzomorphan
2′-Hydroxy-2-[γ-(p-methylbenzoyl)-n-propyl]-6,7-benzomorphan
2-[γ-(p-Fluorobenzoyl)-n-propyl]-6,7-benzomorphan
2′-Methoxy-2-[γ-(p-chlorobenzoyl)-n-propyl]-6,7-benzomorphan
2′-Hydroxy-2-[γ-(3,4-dimethoxybenzoyl)-n-butyl]-6,7-benzomorphan
2′-Hydroxy-2-[β-(p-trifluoromethylbenzoyl)-n-propyl]-6,7-benzomorphan
2′-Hydroxy-2-[β-(3,4-dimethoxybenzoyl)-n-propyl]-6,7-benzomorphan
2-[β-(p-Methoxybenzoyl)-n-propyl]-6,7-benzomorphan
2′-Hydroxy-2-[β-(p-fluorobenzoyl)ethyl]-6,7-benzomorphan
2-[β-(p-Fluorobenzoyl)ethyl]-6,7-benzomorphan
2′-Hydroxy-2-[β-(p-methoxybenzoyl)ethyl]-6,7-benzomorphan
2-[β-(p-Methoxybenzoyl)ethyl]-6,7-benzomorphan
2′-Hydroxy-2-[β-(3,4-dimethoxybenzoyl)ethyl]-6,7-benzomorphan
2′-Hydroxy-2-[β-(m-fluorobenzoyl)ether]-6,7-benzomorphan
2′-Methoxy-2-[γ-(p-fluorobenzoyl)-n-propyl]-5-(β-methoxyethyl)-6,7-benzomorphan
2′-Methoxy-2-[δ-(p-methylbenzoyl)-n-butyl]-5-(β-methoxyethyl)-6,7-benzomorphan
2-[γ-(p-Fluorobenzoyl)-n-propyl]-5-(β-methoxyethyl)-6,7-benzomorphan
2′-Hydroxy-2-[γ-(p-fluorobenzoyl)-n-propyl]-5-(β-hydroxyethyl)-6,7-benzomorphan
2′-Methoxy-2-[γ-(p-methoxybenzoyl)-n-propyl]-5-(β-methoxyethyl)-6,7-benzomorphan
2-[γ-(3,4-Dimethoxybenzoyl)-n-propyl]-5-(β-ethoxyethyl)-6,7-benzomorphan
2′-Methoxy-2-[γ-(m-fluorobenzoyl)-n-propyl]-5-(β-methoxyethyl)-6,7-benzomorphan
2′-Methoxy-2-[β-(p-fluorobenzoyl)ethyl]-5-(β-methoxyethyl)-6,7-benzomorphan
2′-Hydroxy-2-[β-(p-fluorobenzoyl)ethyl]-5-(β-hydroxyethyl)-6,7-benzomorphan
2-[β-(p-Fluorobenzoyl)ethyl]-5-(β-methoxyethyl)-6,7-benzomorphan
2′-Methoxy-2-[β-(p-methoxybenzoyl)ethyl]-5-(β-methoxyethyl)-6,7-benzomorphan
2′-Nitro-2-[γ-(p-fluorobenzoyl)-n-propyl]-5,9-dimethyl-6,7-benzomorphan
2′-Amino-2-[γ-(p-fluorobenzoyl)-n-propyl]-5,9-dimethyl-6,7-benzomorphan
2′-Chloro-2-[γ-(p-methoxybenzoyl)-n-propyl]-5,9-dimethyl-6,7-benzomorphan
2′-Nitro-2-[γ-(p-fluorobenzoyl)-n-propyl]-5-methyl-6,7-benzomorphan
2′-Nitro-2-[γ-(p-fluorobenzoyl)-n-propyl]-6,7-benzomorphan
2′-Amino-2-[γ-(p-fluorobenzoyl)-n-propyl]-5-methyl-6,7-benzomorphan
2′-Amino-2-[γ-(p-fluorobenzoyl)-n-propyl]-6,7-benzomorphan
2′-Nitro-2-[γ-(p-fluorobenzoyl)-n-propyl]-9-methyl-6,7-benzomorphan
2′-Amino-2-[γ-(p-fluorobenzoyl)-n-propyl]-9-methyl-6,7-benzomorphan 2'-Nitro-2-[γ-(p-methoxybenzoyl)-n-propyl]-
 6,7-benzomorphan
2'-Nitro-2-[β-(p-fluorobenzoyl)ethyl]-5,9-dimethyl-
 6,7-benzomorphan
2'-Chloro-2-[γ-(p-methoxybenzoyl)-n-propyl]-5-(β-
 methoxyethyl)-6,7-benzomorphan
2'-Fluoro-2-[γ-(p-fluorobenzoyl)-n-propyl]-5,9-dimethyl-
 6,7-benzomorphan
2'-Nitro-2-[β-(p-fluorobenzoyl)ethyl]-6,7-benzo-
 morphan
2-[γ-(p-Fluorobenzoyl)-n-propyl]-5,8,9-trimethyl-6,7-
 benzomorphan
2'-Hydroxy-2-[γ-(p-fluorobenzoyl)-n-propyl]-5,8,9-tri-
 methyl-6,7-benzomorphan
2'-Hydroxy-2-[γ-(p-fluorobenzoyl)-n-propyl]-5,8-di-
 methyl-6,7-benzomorphan
2'-Hydroxy-2-[γ-(p-fluorobenzoyl)-n-propyl]-8-
 methyl-6,7-benzomorphan
2'-Hydroxy-2-[β-(p-fluorobenzoyl)ethyl]-5,8,9-tri-
 methyl-6,7-benzomorphan
2'-Hydroxy-3'-methyl-2-[γ-(p-fluorobenzoyl)-n-propyl]-
 5,9-dimethyl-6,7-benzomorphan
2'-Hydroxy-2-[γ-(p-methoxybenzoyl)-n-propyl]-3,5-di-
 methyl-6,7-benzomorphan
2'-Hydroxy-2-[γ-(p-fluorobenzoyl)-n-propyl]-5-methyl-
 8-oxo-6,7-benzomorphan
2'-Hydroxy-2-[γ-(p-fluorobenzoyl)-n-propyl]-5,9-di-
 methyl-8-methylene-6,7-benzomorphan
2'-Hydroxy-2-[γ-(p-fluorobenzoyl)-n-propyl]-3,5-di-
 methyl-6,7-benzomorphan
2'-Hydroxy-3'-methyl-2-[γ-(p-fluorobenzoyl)-n-propyl]-
 6,7-benzomorphan
2'-Hydroxy-2-[γ-(3,4-dimethoxybenzoyl)-n-propyl]-
 5,8,9-trimethyl-6,7-benzomorphan
2'-Hydroxy-2-[β-(p-methoxybenzoyl)ethyl]-5,8,9-
 trimethyl-6,7-benzomorphan
2'-Hydroxy-2-[γ-(p-fluorobenzoyl)-n-propyl]-9-
 methyl-6,7-benzomorphan
2'-Hydroxy-2-[γ-(m-fluorobenzoyl)-n-propyl]-9
 methyl-6,7-benzomorphan
2'-Hydroxy-2-[γ-(p-fluorobenzoyl)-n-butyl]-9-methyl-
 6,7-benzomorphan
2'-Hydroxy-2-[γ-(p-trifluoromethylbenzoyl)-n-propyl]-9-
 methyl-6,7-benzomorphan
2'-Hydroxy-2-[γ-(p-methoxybenzoyl)-n-propyl]-9-
 methyl-6,7-benzomorphan
2-[γ-(p-Fluorobenzoyl)-n-propyl]-9-methyl-6,7-
 benzomorphan
2-[γ-(p-Methoxybenzoyl)-n-propyl]-9-methyl-6,7-
 benzomorphan
2'-Hydroxy-2-[β-(p-fluorobenzoyl)ethyl]-9-methyl-6,7-
 benzomorphan
2-[β-(p-Fluorobenzoyl)ethyl]-9-methyl-6,7-benzo-
 morphan
2'-Hydroxy-2-[β-(p-methoxybenzoyl)ethyl]-9-methyl-
 6,7-benzomorphan
2-[β-(p-Methoxybenzoyl)ethyl]-9-methyl-6,7-
 benzomorphan
2'-Hydroxy-2-[γ-(3,4-dimethoxybenzoyl)-n-propyl]-9-
 methyl-6,7-benzomorphan The 6,7-benzomorphan derivatives [I] in which $R_2$ is a $C^1$–$C^3$ alkyl group have two stereo isomers, cis-6,7-benzomorphan derivative [I] ($R_2$ is α-configuration) and trans-6,7-benzomorphan derivative [I] ($R_2$ is β-configuration).

Each of these isomers are separated and purified by the method of fractional crystallization, fractional distillation and column chromatography from the reaction mixture.

Moreover, each of these isomers are also prepared by reacting the cis- or trans - 6,7 - benzomorphan derivatives [III] with the reactive halide [IV].

Hitherto, a few processes have been studied for the production of the cis- and trans-6,7-benzomorphan derivatives [V].

Thus, Everret L. May (Journal of Organic Chemistry, 28, 2470 (1963) discloses the process as follows:

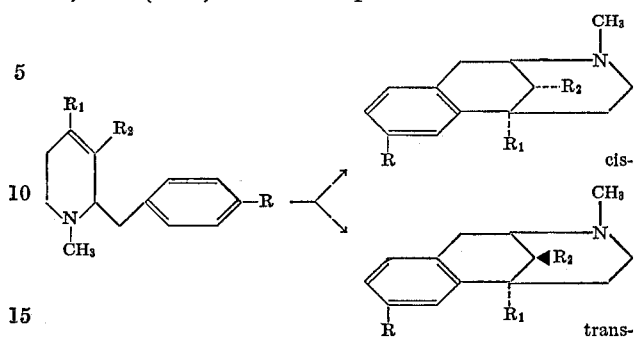

wherein R is a hydrogen atom, a methoxy group or a hydroxyl group; and $R_1$ and $R_2$ each signify a methyl group or an ethyl group.

Furthermore, F. M. Fry (Journal of Organic Chemistry, 28, 1869 (1963)) prepared only the trans-6,7-benzomorphan derivative (V) via the stereo-specific route shown by the following scheme:

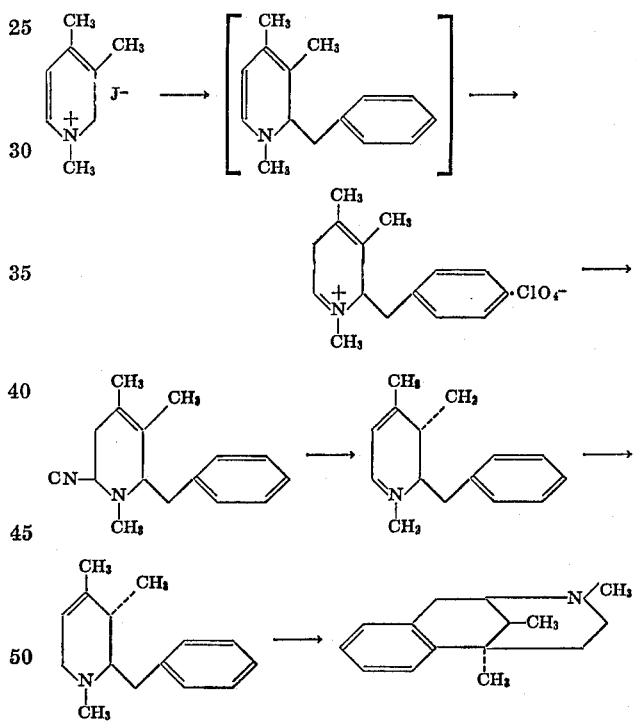

Further, Everret L. May (Journal of Organic Chemistry, 22, 1366 (1957)) prepared the cis-6,7-benzomorphan derivative (V) via the route of nitration as follows:

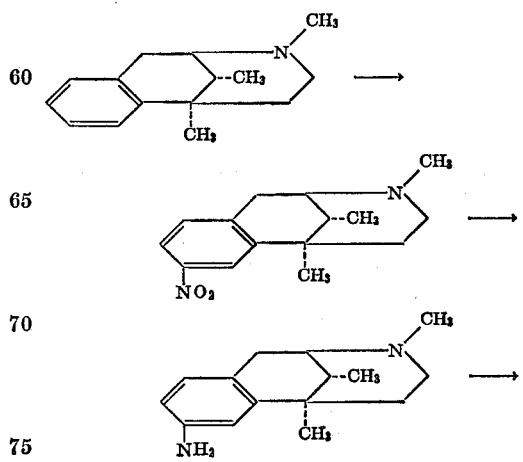

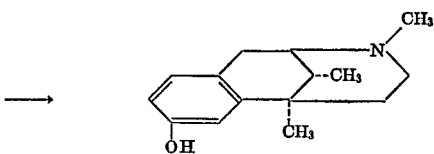

Contrary to the above, the present inventors prepared the trans-6,7-benzomorphan derivative (V) via the same route, that is, as follows:

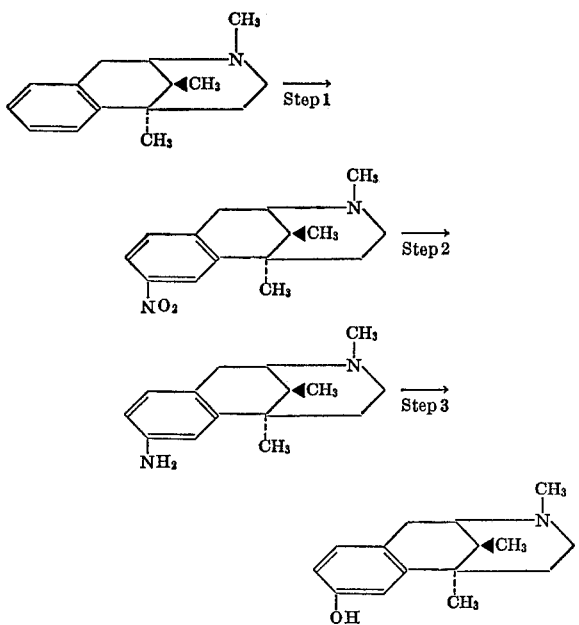

In the above scheme, the present inventors found that nitration mainly occured at 2'-position, but as by-products, the next compounds were obtained.

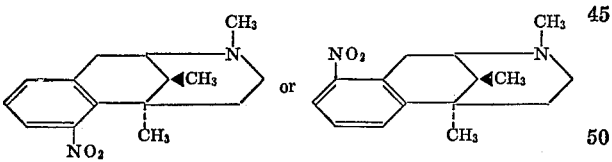

About this process, the present inventors demonstrated in detail in Example 41.

Thus obtained cis- and trans-6,7-benzomorphan derivatives (V) are separated and purified by the above-mentioned methods, and then converted to starting materials, cis- or trans-6,7-benzomorphan derivatives III by demethylation. Furthermore, each of these stereo isomers has asymmetric carbon atoms, so that there are obtained four different kinds of optical active 6,7-benzomorphan derivatives (I), i.e. (+)-cis, (−)-cis, (+)-trans, (−)-trans isomers by a conventional optical resolution method.

6,7-Benbomorphan derivatives such as 2'-hydroxy-2,5,9-trimethyl-6,7-benzomorphan (U.S. Pat. No. 3,138,603) have a potent analgesic activity, but show an addiction liability. On account of this addiction liability, these analgesics are severely restricted in a therapeutic use. Surprisingly, as shown in Table 1, the present 6,7-benzomorphan derivatives (I) do not show any addiction liability syndrome in detailed animal tests. For example, when these present compounds were administered orally or subcutaneously to animals every day for a long term, the animals did not produce any physical dependency.

TABLE 1.—CHRONICAL ADMINISTRATION TEST IN RATS

| Compound | Dose (mg./kg., S.C.[1]/day for 4 weeks) | Abstinence syndrome |
|---|---|---|
| α-2'-hydroxy-2-[γ-(p-fluorobenzoyl)-n-propyl]-5,9-dimethyl-6,7-benzomorphan | 20 | — |
| α-2-[γ-(p-fluorobenzoyl)-n-propyl]-5,9-dimethyl-6,7-benzomorphan | 20 | — |
| α-2'-hydroxy-2-[γ-(p-fluorobenzoyl)-n-propyl]-5-methyl-9-ethyl-6,7-benzomorphan | 20 | — |
| 2'-Hydroxy-2-[γ-(p-fluorobenzoyl)-n-propyl]-5-methyl-6,7-benzomorphan | 20 | — |
| 2'-hydroxy-2-[γ-(p-fluorobenzoyl)-n-propyl]-6,7-benzomorphan | 20 | — |
| 2-[γ-(p-fluorobenzoyl)-n-propyl]-5-methyl-6,7-benzomorphan | 20 | — |
| 2-[γ-(p-fluorobenzoyl)-n-propyl]-6,7-benzomorphan | 20 | — |
| α-2'-hydroxy-2-(γ-benzoyl-n-propyl)-5,9-dimethyl-6,7-benzomorphan | 20 | — |
| α-2'-hydroxy-2,5,9-trimethyl-6,7-benzomorphan | 20 | ++ |
| Morphine | 20 | +++ |

[1] S.C. means "subcutaneous injection."

NOTE.—Rat: Wistar strain, ♂, 150 g. body weight at the beginning of the test; each group consists of 20 animals.

Furthermore, the present 6,7 - benzomorphan derivatives [I] have mild or strong analgesic activity in a subcutaneous writhing test, and some of them have shown potent analgesic action, which potencies are much greater than that of pentazocine, the first class non-narcotic analgesic. (Table 2)

The method is based on the specific antagonism of analgesics to the typical syndrome produced by intraperitoneal injection of 0.6% of aqueous acetic acid. The syndrome is characterized by intermittent contractions of the abdomen, twisting and turning of trunk and extension of hind legs.

A group of 5 mice was used for each dose level. Compounds were administered subcutaneously 20 minutes before injection of acetic acid. Number of mice which showed no pain response was recorded. $ED_{50}$ was calculated according to the Litchfield-Wilcoxon's method.

TABLE 2

| Compound: | Effect in subcutaneous writhing test ($ED_{50}$) mg./kg. |
|---|---|
| 2' - Hydroxy - 2 - [γ - (p - fluorobenozyl) - n-propyl] - 5,9-dimethyl-6,7-benzomorphan | 4.1 |
| 2' - Hydroxy - 2-[γ - (p - fluorobenzoyl) - n - propyl] - 5 - methyl-9-ethyl-6,7-benzomorphan | 7.1 |
| 2' - Hydroxy - 2 - [γ - (p - methoxybenzoyl) - n - propyl] - 5 - methyl - 9 - ethyl - 6,7 - benzomorphan | 10.0 |
| 2' - Hydroxy - 2 - [γ-(3,4-dimethoxybenzoyl)-n-propyl]5,9-dimethyl-6,7-benzomorphan | 5.6 |
| 2 - [γ - (p - Fluorobenzoyl)-n-propyl] - 5,9 - dimethyl - 6,7 - benzomorphan | 10.5 |
| 2' - Hydroxy - 2-[γ - (p-methoxybenzoyl) - n - propyl] - 5,9-dimethyl-6,7-benzomorphan | 2.5 |
| 2' - Hydroxy - 2 - (γ - benzoyl - n - propyl) - 5,9 - dimethyl - 6,7 - benzomorphan | 7.5 |
| α - 2' - Hydroxy - 2 - (γ - benzoyl - n - propyl)- 5 - methyl - 9 - ethyl - 6,7 - benzomorphan | 7.5 |
| 2' - Hydroxy - 2 - [γ - (p - fluorobenzoyl) - n - propyl] - 5 - methyl - 6,7 - benzomorphan | 2.0 |
| 2' - Hydroxy - 2 - [γ - (p - fluorobenzoyl) - n - propyl] - 6,7 - benzomorphan | 1.4 |
| β - 2' - Hydroxy - 2 - [γ - (p-fluorobenzoyl)-n-propyl] - 5,9-dimethyl-6,7-benzomorphan | 1.5 |
| α - 2' - Hydroxy - 2 - [β - (p - fluorobenzoyl)-ethyl] - 5,9 - dimethyl - 6,7-benzomorphan | 15.0 |
| α - 2' - Methoxy - 2 - [γ - (p - fluorobenzoyl)-n-propyl]-5,9-dimethyl-6,7-benzomorphan | 7.0 |
| 2' - Hydroxy - 2 -[β - (p-fluorobenzoyl)ethyl]-6,7 - benzomorphan | 7.0 |
| 2 - (γ - Benzoyl - n - propyl) - 5 - methyl - 6,7-benzomorphan | 9.0 |

TABLE 2—Continued

| Compound: | Effect in subcutaneous writhing test (ED$_{50}$) mg./kg. |
|---|---|
| α - 2' - Hydroxy - 2 - [β-(p-methoxybenzoyl)-ethyl] - 5,9 - dimethyl - 6,7-benzomorphan | 7.0 |
| α - 2' - Acetoxy - 2 - [γ - (p - fluorobenzoyl)-n-propyl]-5,9-dimethyl-6,7-benzomorphan | 7.0 |
| 2 - [γ - (p - Fluorobenzoyl) - n - propyl] - 5 - methyl - 6,7 - benzomorphan | 6.0 |
| 2 - [γ - (p - Fluorobenzoyl) - n - propyl]-6,7-benzomorphan | 7.0 |
| α - 2' - Hydroxy - 2 - [γ - (p - fluorobenzoyl)-n - propyl] - 5,8,9 - trimethyl 6,7-benzomorphan | 12.0 |
| α - 2' - Hydroxy - 3' - methyl - 2 - [γ - (p-fluorobenzoyl) - n - propyl] - 5,9 - dimethyl-6,7 - benzomorphan | 17.0 |
| α - 2' - Hydroxy - 2 - [γ - (m - fluorobenzoyl)-n - propyl] - 5,9 - dimethyl - 6,7 - benzomorphan | 12.0 |
| Pentazocine (2' - hydroxy - 2 - (3'' - methyl-2'' - butenyl) - 5,9 - dimethyl - 6,7- benzomorphan) | 17.5 |

Among these compounds, some compounds are shown to have potent analgesic effect not only in this writing test, but also other analgesic tests, for example, a hot plate test, and Hoffner method test. Moreover, as shown in Table 3, the present compounds have a mild calming effect, which effect sometimes boosts the analgesic effect.

TABLE 3

Tranquilizing Activity Test in Rats (Anti-Apomorphine Test)

| Compound: | ED$_{50}$ on anti-apomorphine test (mg./kg. S.C.) |
|---|---|
| α - 2' - Hydroxy - 2 - [γ - (6-fluorobenzoyl)-n-propyl]5,9 - dimethyl-6,7-benzomorphan | 84.0 |
| 2' - Hydroxy - 2 - [γ - (p - fluorobenzoyl) - n-propyl] - 5 -methyl - 6,7-benzomorphan | 70.0 |
| Haloperidol* | 0.08 |

*Haloperidol is a representative tranquilizer.
NOTE.—Rat: Wistar strain, ♂, 150–180 g. body weight; each group consists of 100 animals.

Moreover, these present compounds have not any unfavorable side effects, for example, rigidity, ataxia, convulsion, emetic activity and respiratory depression, etc., unlike other morphine and 6,7-benzomorphan derivatives.

As shown in Tables 4 and 5, the present compounds showed no respiration depressing activity and no emetic activity. This is also a prominent characteristic of the present compounds.

TABLE 4.—EFFECT ON RESPIRATION IN DOGS

| Compound | Dose (mg./kg., i.m.[1]) | Effect on respiration |
|---|---|---|
| α-2'-hydroxy-2-[γ-(p-fluorobenzoyl)-n-propyl]-5,9-dimethyl-6,7-benzomorphan. | 20<br>40<br>80 | No.<br>No.<br>No. |
| 2'-hydroxy-2-[γ-(p-fluorobenzoyl)-n-propyl]-5-methyl-6,7-benzomorphan. | 20<br>40<br>80 | No.<br>No.<br>No. |
| 2'-hydroxy-2-[γ-(p-fluorobenzoyl)-n-propyl]-6,7-benzomorphan. | 20<br>40<br>80 | No.<br>No.<br>No. |
| α-2'-hydroxy-2,5,9-trimethyl-6,7-benzomorphan. | 20 | Depression +++. |
| Morphine | 20 | Do. |

[1] I.m. means "intramuscular injection."
NOTE.—Dog: Beagel strain, ♂, 8–12 kg. body weight; each group consists of 10 animals.

TABLE 5.—EMETIC ACTIVITY IN DOGS

| Compound | Dose (mg./kg., i.m.) | Emetic activity |
|---|---|---|
| α-2'-hydroxy-2-[γ-(p-fluorobenzoyl)-n-propyl]-5,9-dimethyl-6,7-benzomorphan. | 20<br>40<br>80 | No.<br>No.<br>No. |
| 2'-hydroxy-2-[γ-(p-fluorobenzoyl)-n-propyl]-5-methyl-6,7-benzomorphan. | 20<br>40<br>80 | No.<br>No.<br>No. |
| 2'-hydroxy-2-[γ-(p-fluorobenzoyl)-n-propyl]-6,7-benzomorphan. | 20<br>40<br>80 | No.<br>No.<br>No. |
| α-2'-hydroxy-2,5,9-trimethyl-6,7-benzomorphan. | 20 | Emetic ++. |
| Morphine | 20 | Emetic +++. |

NOTE.—Dog: Beagle strain, ♂, 8–12 kg. body weight; each group consists of 10 animals.

As shown in Table 6, morphine and other benzomorphan derivatives have not any local anesthetic activity, but the present compounds showed a potent local anesthetic activity. This is also a prominent characteristic of the present compounds.

TABLE 6.—LOCAL ANESTHETIC ACTIVITY TEST

| Compound | Concentration, percent | Local anesthetic activity in guinea pig, intradermal method |
|---|---|---|
| α-2'-hydroxy-2-[γ-(p-fluorobenzoyl)-n-propyl]-5,9-dimethyl-6,7-benzomorphan. | 1 | +++ |
| 2'-hydroxy-2-[γ-(p-fluorobenzoyl)-n-propyl]-5-methyl-6,7-benzomorphan. | 1 | +++ |
| 2'-hydroxy-2-[γ-(p-fluorobenzoyl)-n-propyl]-6,7-benzomorphan. | 1 | +++ |
| α-2'-hydroxy-2,5,9-trimethyl-6,7-benzomorphan. | 1 | — |
| Morphine | 1 | — |
| Xylocaine | 1 | +++ |
| Procaine | 1<br>2 | ++<br>+++ |

NOTE.—Guinea pig: Hartley strain, ♂, 250–300 g. body weight; each group consists of 3 animals.

The above-mentioned prominent characteristics of the present compounds, that is, no addiction liability, no respiratory depression, no emetic activity, a potent analgesic activity, a potent local anesthetic activity and a mild tranquilizing activity are attributed to 2-aroylalkyl-substituted 6,7-benzomorphan and cannot be seen in morphine and other 6,7-benzomorphan derivatives.

The compounds can be prepared for use by dissolving under sterile conditions a salt form of the compounds in water (or an equivalent amount of a non-toxic acid if the free base is used), or in a physiologically compatible aqueous medium such as saline, and stored in ampoules for use by injection.

Alternatively, the compounds can be incorporated in unit dosage (1–15 mg.) form as tablets or capsules for oral administration either alone or in combination with suitable adjuvants such as calcium carbonate, starch, lactose, talc, magnesium stearate, gum acacia, and the like.

The following examples are representative of the methods of production of the compounds. Modifications of these procedures will be obvious to those skilled in the art and these examples are not to be construed as limiting the scope of this invention.

EXAMPLE 1

2'-Hydroxy-2-[γ-(p-fluorobenzoyl)-n-propyl]-5,9-dimethyl-6,7-benzomorphan (a) 2'-Hydroxy - 2 - [4''-(p-fluorophenyl)-4'',4''-ethylenedioxy-n-butyl]-5,9-dimethyl-6,7-benzomorphan: To a mixture of 1.08 g. of 2'-hydroxy-5,9-dimethyl-6,7-benzomorphan, 0.6 g. of sodium bicarbonate and 15 ml. of dimethylformamide is added 1.43 g. of 4-(p - fluorophenyl)-4,4-ethylenedioxy-1-bromobutane. The resultant mixture is stirred at 130°–145° C. for 4 hours. The solvent is removed under reduced pressure to residue, to which is added water. The mixture is allowed to stand in a refrigerator, and a precipitate is obtained, m.p.: 174°–179° C. Recrystallization from ethyl acetate gives pure crystals of 2′ - hydroxy-2-[4″-(p-fluorophenyl) - 4″,4″-ethylenedioxy-n-butyl]-5,9-dimethyl - 6,7-benzomorphan, m.p.: 180°–183° C.

IR$\nu_{\text{Paraffin}}^{\text{cm.}^{-1}}$: 1605, 1582, 1500, 1210, 1147, 1043, 830

Anal.—Calcd. for $C_{26}H_{32}NO_3F$: C, 73.38; H, 7.58; N, 3.29%. Found: C, 73.51; H, 7.62; N, 3.25%.

(b) 2′-Hydroxy-2-[γ-(p-fluorobenzoyl)-n-propyl] - 5,9-dimethyl-6,7-benzomorphan: A mixture of 2.4 g. of 2′-hydroxy - 2 - [4″-(p-fluorophenyl) - 4″,4″-ethylenedioxy-n-butyl] - 5,9-dimethyl-6,7-benzomorphan, 20 ml. of methanol, 10 ml. of water and 1.5 ml. of concentrated hydrochloric acid is refluxed for 1 hour. After the reaction mixture is concentrated under reduced pressure, the mixture is made alkaline with excess aqueous ammonia, and is extracted with ether. The ether extracts are washed with water saturated with sodium chloride, dried over anhydrous sodium sulfate, and filtered. The filtrate is concentrated to dryness to give the crude compound. Recrystallization from ethyl acetate gives 2′-hydroxy-2-[γ-(p-fluorobenzoyl) - n-propyl] - 5,9-dimethyl - 6,7-benzomorphan, m.p.: 166°–169° C.

IR$\nu_{\text{Paraffin}}^{\text{cm.}^{-1}}$: 2600 (broad), 1960, 1598, 1582, 1222, 840, 769

Anal.—Calcd. for $C_{24}H_{28}NO_2F$: C, 75.56; H, 7.40; N, 3.67%. Found: C, 75.48; H, 7.43; N, 3.81%.

This 6,7-benzomorphan is dissolved in chloroform and gaseous hydrogen chloride is introduced to the solution. The solvent is removed, and the residue is recrystallized from acetone-methanol. This hydrochloride has a melting point of 213° to 215° C.

IR$\nu_{\text{Paraffin}}^{\text{cm.}^{-1}}$: 2580, 2550, 1690, 1620, 1599, 1585, 1504, 1210, 1204, 1148, 831

Anal.—Calcd. for $C_{24}H_{29}NO_2ClF$: C, 68.97; H, 6.99; N, 3.35; Cl, 8.48%. Found: C, 68.98; H, 7.19; N, 3.63; Cl, 8.27%.

EXAMPLE 2

2-[γ-(p-Fluorobenzoyl)-n-propyl]-5,9-dimethyl-6,7-benzomorphan (a) 2 - [4″-(p-Fluorophenyl) - 4″,4″-ethylenedioxy-n-butyl]-5,9-dimethyl - 6,7-benzomorphan: A mixture of 3 g. of 5,9-dimethyl-6,7-benzomorphan, 1.89 g. of sodium bicarbonate, 4.29 g. of 4-(p-fluorophenyl)-4,4-ethylenedioxyl-1-chlorobutane and 30 ml. of ethanol is heated under reflux with stirring for 6 hours. This mixture is concentrated under reduced pressure until most of the ethanol has been removed, and water is added thereto. The mixture is extracted several times with ether. The combined extract is washed with water saturated with sodium chloride, dried over anhydrous sodium sulfate, and filtered. The filtrate is concentrated, and the residue is distilled under reduced pressure to give 4.75 g. of 2-[4″-(p-fluorophenyl)-4″,4″-ethylenedioxy-n-butyl] - 5,9-dimethyl - 6,7-benzomorphan, b.p.: 110°–119° C./0.8 mm. Hg.

IR$\nu_{\text{liq.}}^{\text{cm.}^{-1}}$: 1605, 1508, 1217, 1150, 1040, 835

(b) 2 - [γ-(p-Fluorobenzoyl)-n-propyl] - 5,9-dimethyl-6,7-benzomorphan: To a mixture of 4.7 g. of 2-[4″-(p-fluorophenyl)-4″,4″-ethylenedioxy-n-butyl] - 5,9-dimethyl-6,7-benzomorphan, 50 ml. of methanol and 30 ml. of water is added 5 ml. of concentrated hydrochloric acid. After the resultant mixture is refluxed for 1 hour, the mixture is concentrated under reduced pressure to residue, which is made alkaline with an aqueous ammonia and extracted with ether. The ether extract is washed with water saturated with sodium chloride, dried over anhydrous sodium sulfate, and filtered. The filtrate is concentrated to a yellow residue, which is distilled under reduced pressure to yield 1.5 g. of 2-[γ-(p-fluorobenzoyl)-n-propyl]-5,9-dimethyl-6,7-benzomorphan, b.p.: 140°–150° C./0.5 mm. Hg.

IR$\nu_{\text{liq.}}^{\text{cm.}^{-1}}$: 1690, 1601, 1510, 1220, 835, 760, 720

A solution of 2-[γ-(p-fluorobenzoyl)-n-propyl]-5,9-dimethyl-6,7-benzomorphan in ether is acidified with gaseous hydrogen chloride. The precipitate produced is collected by filtration and washed with ether.

Recrystallization from ether-acetone gives 2 - [γ - (p-fluorobenzoyl)-n-propyl] - 5,9-dimethyl - 6,7-benzomorphan hydrochloride, m.p.: 164°–166° C.

IR$\nu_{\text{Paraffin}}^{\text{cm.}^{-1}}$: 2350 (broad), 1680, 1600, 1508, 832, 760, 750, 720

Anal.—Calcd. for $C_{24}H_{29}NOClF$: C, 71.72; H, 7.27; N, 3.48; Cl, 8.82%. Found: C, 71.42; H, 7.40; N, 3.39; Cl, 8.77%.

EXAMPLE 3

2′-Hydroxy-2-[γ-(p-fluorobenzoyl)n-propyl]-5-methyl-9-ethyl-6,7-benzomorphan (a) 2′-Hydroxy - 2 - [4″-(p-fluorophenyl) - 4″,4″-ethylenedioxy-n-butyl] - 5 - methyl-9-ethyl - 6,7-benzomorphan: According to the procedure of Example 1(a), the reaction of 2.31 g. of 2′-hydroxy-5-methyl-9-ethyl-6,7-benzomorphan with 2.56 g. of 4-(p-fluorophenyl)-4,4-ethylenedioxy-1-chlorobutane gives 2′-hydroxy - 2 - [4″-(p-fluorophenyl) - 4″,4″-ethylenedioxy-n-butyl] - 5 - methyl-9-ethyl-6,7-benzomorphan, m.p.: 161°–167° C.

Recrystallization from ethyl acetate causes raising of the melting point to 170°–171° C.

IR$\nu_{\text{Paraffin}}^{\text{cm.}^{-1}}$: 1615, 1605, 1579, 835, 794

Anal.—Calcd. for $C_{27}H_{34}NO_3F$: C, 73.77; H, 7.80; N, 3.19%. Found: C, 73.58; H, 7.78; N, 3.52%.

(b) 2′-Hydroxy - 2 - [γ-(p-fluorobenzoyl)-n-propyl]-5-methyl-9-ethyl-6,7-benzomorphan: According to the procedure of Example 1(b), 2′-hydroxy-2-[4″-(p-fluorophenyl)-4″,4″-ethylenedioxy-n-butyl] - 5 - methyl - 9 - ethyl-6,7-benzomorphan converts to 2′-hydroxy-2-[γ-(p-fluorobenzoyl)-n-propyl] - 5 - methyl-9-ethyl-6,7-benzomorphan hydrochloride, m.p.: 160°–165° C.

IR$\nu_{\text{Paraffin}}^{\text{cm.}^{-1}}$: 1620, 1720, 1597, 1582, 1500, 838

Anal.—Calcd. for $C_{25}H_{31}NO_2ClF$: C, 69.82; H, 7.23; N, 3.24%. Found: C, 69.78; H, 7.29; N, 3.29%.

EXAMPLE 4

2′-Hydroxy-2-[δ-(p-chlorobenzoyl)-n-propyl]-5,9-dimethyl-6,7-benzomorphan (a) 2′-Hydroxy-2-[4″-(p - chlorophenyl)-4″,4″-ethylenedioxy-n-butyl]-5,9-dimethyl - 6,7 - benzomorphan: A mixture of 2.17 g. of 2′-hydroxy-5,9-dimethyl-6,7-benzomorphan, 1.26 g. of sodium bicarbonate, 30 ml. of dimethylformamide and 3.29 g. of 4-(p-chlorophenyl)-4,4-ethylenedioxy-1-chlorobutane is stirred at 130°–140° C. for 3 hours. The solvent is removed under reduced pressure to a residue, to which is added water. The precipitate produced is collected by filtration and recrystallized from ether-methanol to give 2′-hydroxy-2-[4″-(p-chlorophenyl)-4″,4″-ethylenedioxy - n - butyl]-5,9-dimethyl-6,7-benzomorphan, m.p.: 169°–170° C.

IR$\nu_{\text{Paraffin}}^{\text{cm.}^{-1}}$: 2650 (broad), 1620, 1603, 1585, 1495, 1225, 1047, 830

Anal.—Calcd. for $C_{26}H_{32}NOCl$: C, 70.65; H, 7.30; N, 3.17; Cl, 8.02%. Found: C, 70.65; H, 7.27; N, 3.14; Cl, 8.23%.

(b) 2′-Hydroxy - 2 - [γ - (p - chlorobenzoyl-n-propyl]-5,9-dimethyl-6,7-benzomorphan: To a mixture of 3.65 g.

of 2′-hydroxy-2-[4″ - (p - chlorophenyl)-4″,4″-ethylenedioxy-n-butyl]5,9-dimethyl-6,7-benzomorphan, 50 ml. of methanol and 30 ml. of water is added 5 ml. of concentrated hydrochloric acid. After the resultant mixture is refluxed for 1 hour, it is concentrated under reduced pressure to a residue, which is made alkaline with excess aqueous ammonia and extracted with ether. The organic solution is washed with water, dried over anhydrous sodium sulfate, and filtered. The filtrate is concentrated to a solid substance. Recrystallization from ether-acetone affords 2′-hydroxy-2-[γ-(p-chlorobenzoyl)-n-propyl]-5,9-dimethyl-6,7-benzomorphan, m.p.: 179°–181° C.

IR$\nu_{Paraffin}^{cm.^{-1}}$: 2600 (broad), 1690, 1625, 1590, 1495, 1235, 1216, 1083, 766

Anal.—Calcd. for $C_{24}H_{28}NO_2Cl$: C, 72.44; H, 7.09; N, 3.52; Cl, 8.91%. Found: C, 72.17; H, 7.25; N, 3.89; Cl, 8.86%.

The free base is converted to the hydrochloride by contacting with dry gaseous hydrogen chloride. The precipitate is collected by filtration and washed with ether. Recrystallization from methanol-acetone gives 2′-hydroxy-2-[γ-(p - chlorobenzoyl)-n-propyl]-5,9-dimethyl-6,7-benzomorphan hydrochloride, m.p.: 191°–192° C.

IR$\nu_{Paraffin}^{cm.^{-1}}$: 2550, 1685, 1616, 1590, 1570, 1505, 1230, 1081, 810, 757

Anal.—Calcd. for $C_{24}H_{29}NO_2Cl$: C, 66.36; H, 6.73; N, 3.22; Cl, 16.32%. Found: C, 65.86; H, 6.96; N, 3.52; Cl, 16.73%.

EXAMPLE 5

2′-Hydroxy-2-[γ-(p-methoxybenzoyl)-n-propyl]-5,9-dimethyl-,7-benzomorphan (a) 2′-Hydroxy-2-[4″-(p - methoxyphenyl)-4″,4″-ethylenedioxy-n-butyl]-5,9-dimethyl-6,7-benzomorphan: To a solution of 2.17 g. of 2′-hydroxy-5,9-dimethyl-6,7-benzomorphan in 30 ml. of dimethylformamide are added 1.2 g. of sodium bicarbonate and 2.7 g. of 4-(p-methoxyphenyl)-4,4-ethylenedioxy - 1 - chlorobutane. The mixture is stirred at 120°–140° C. for two hours. The solvent is evaporated under reduced pressure, and water is added thereto. After the mixture is allowed to stand in the refrigerator, the precipitate produced is collected and recrystallized from ethyl acetate to yield 2′-hydroxy-2-[4″-(p - methoxyphenyl)-4″,4″-ethylenedioxy-n-butyl]-5,9-dimethyl-6,7-benzomorphan, m.p.: 156°–158.5° C.

IR$\nu_{Paraffin}^{cm.^{-1}}$: 2650 (broad), 1615, 1580, 1515, 1500, 1245, 1050, 830

Anal.—Calcd. for $C_{27}H_{35}NO_4$: C, 74.11; H, 8.06; N, 3.20%. Found: C, 73.74; H, 8.20; N, 3.60%.

(b) 2′-Hydroxy-2-[γ-(p - methoxybenzoyl)-n-propyl]-5,9-dimethyl-6,7-benzomorphan: To a mixture of 2.0 g. of 2′-hydroxy-2-[4″-(p - methoxyphenyl)-4″,4″-ethylenedioxy-n-butyl]-5,9-dimethyl-6,7-benzomorphan, 20 ml. of methanol and 10 ml. of water is added 1.5 ml. of concentrated hydrochloric acid. The mixture is heated with stirring for one hour. The reaction mixture is concentrated under reduced pressure to remove the methanol and made alkaline with an aqueous ammonia. The solution is extracted with chloroform. The extract is washed with water saturated with sodium chloride, dried over anhydrous sodium sulfate, and filtered. The solvent is removed to give the crude product. Recrystallization from ethyl acetate gives 2′-hydroxy-2-[γ-(p-methoxybenzoyl)-n-propyl]-5,9-dimethyl-6,7-benzomorphan, m.p.: 148°–152.8° C.

IR$\nu_{Paraffin}^{cm.^{-1}}$: 2650 (broad), 1680, 1600, 1580, 1500, 1255, 1160, 1020, 820, 760

Anal.—Calcd. for $C_{25}H_{31}NO_3$: C, 76.30; H, 7.94; N, 3.56%. Found: C, 76.16; H, 7.88; N, 3.42%.

EXAMPLE 6

2′-Hydroxy-2-[γ-(p-methylbenzoyl)-n-propyl]-5,9-dimethyl-6,7-benzomorphan (a) 2′-Hydroxy-2-[4″-(p-methylphenyl)-4″,4″-ethylenedioxy-n-butyl]-5,9-dimethyl - 6,7-benzomorphan: According to the procedure of Example 1(a), but using 2.17 g. of 2′-hydroxy-5,9-dimethyl-6,7-benzomorphan, 1.2 g. of sodium bicarbonate, 30 ml. of dimethylformamide and 2.06 g. of 4-(p-methylphenyl)-4,4-ethylenedioxy-1-chlorobutane, there is produced crude 2′-hydroxy-2-[4″-(p-methylphenyl)-4″,4″-ethylenedioxy - n - butyl]-5,9-dimethyl-6,7-benzomorphan. Recrystallization of the crude product from ethyl acetate yields pure crystals of 2′-hydroxy-2-[4″-(p - methylphenyl) - 4″,4″-ethylenedioxy-n-butyl]-5,9-dimethyl-6,7-benzomorphan having a melting point of 173° to 176° C.

IR$\nu_{Paraffin}^{cm.^{-1}}$: 2650 (broad), 1615, 1580, 1505, 1240, 1050, 820

Anal.—Calcd. for $C_{27}H_{35}NO_3$: C, 76.92; H, 8.37; N. 3.32%. Found: C, 76.84; H, 8.55; N, 3.82%.

(b) 2′-Hydroxy-2-[γ - (p - methylbenzoyl)-n-propyl]-5,9-dimethyl-6,7-benzomorphan: According to the procedure of Example 1(b), but using 2.5 g. of 2′-hydroxy-2-[4″-(p-methylphenyl) - 4″,4″ - ethylenedioxy-n-butyl]-5,9-dimethyl-6,7-benzomorphan, there is produced a crude compound which is recrystallized from ethyl acetate to give pure crystals of 2′-hydroxy-2-[γ-(p-methylbenzoyl)-n-propyl]-5,9-dimethyl-6,7-benzomorphan, m.p.: 157.5°–164.5° C.

IR$\nu_{Paraffin}^{cm.^{-1}}$: 2600 (broad), 1683, 1610, 1580, 1498, 1233, 800, 765

Anal.—Calcd. for $C_{25}H_{31}NO_2$: C, 79.53; H, 8.28; N, 3.71%. Found: C. 79.45; H, 8.29; N, 3.80%.

EXAMPLE 7

2′-Hydroxy-2-[γ-(p-trifluoromethylbenzoyl)-n-propyl]-5,9-dimethyl-6,7-benzomorphan A mixture of 1.19 g. of 2′-hydroxy-5,9-dimethyl-6,7-benzomorphan, 0.6 g. of sodium bicarbonate, 1.77 g. of 4-(p-trifluoromethylphenyl)-4,4-ethylenedioxy - 1-chlorobutane and 15 ml. of dimethylformamide is stirred at 130°–145° C. for three hours. This reaction mixture is concentrated under reduced pressure until most of the dimethylformamide has been removed, and water is added thereto and, it is extracted with ether. The ether extract is washed with water, dried over anhydrous sodium sulfate, and filtered. The filtrate is treated with decolorizing charcoal and concentrated under reduced pressure. The residual oil is dissolved in hot aqueous methanol and the solution is treated with concentrated hydrochloric acid to pH 1. After the solution is refluxed for one hour, the solution is treated with charcoal and filtered. After the filtrate is concentrated under reduced pressure, it is made alkaline with an aqueous ammonia and extracted with chloroform. The extract is washed with water, dried over anhydrous sodium sulfate, filtered and concentrated to an amorphous residue. This residue is chromatographed on a silica gel column with ethyl acetate to give the crude product. This compound is recrystallized from ethyl acetate to yield 2′-hydroxy-2-[γ-(p-trifluoromethylbenzoyl)-n-propyl]-5,9 - dimethyl-6,7-benzomorphan, m.p.: 116.5°–120° C.

IR$\nu_{Paraffin}^{cm.^{-1}}$: 1690, 1612, 1578, 1128, 1065, 1015, 830

Anal.—Calcd. for $C_{25}H_{28}NO_2F_3$: C, 69.59; H. 6.54; N, 3.25%. Found: C, 69.81; H, 6.73; N, 3.40%.

EXAMPLE 8

2′-Hydroxy-2-[γ-(p-methoxybenzoyl)-n-propyl]-5-methyl-9-ethyl-6,7-benzomorphan (a) 2′-Hydroxy-2-[4″-(p-methoxyphenyl)-4″,4″-ethylenedioxy-n-butyl]-5-methyl - 9-ethyl-6,7-benzomorphan: According to the procedure of Example 5(a), the reaction of 2′-hydroxy-5-methyl-9-ethyl-6,7-benzomorphan (2.3 g.) with 2.7 g. of 4-(p-methoxyphenyl)-4,4-ethylenedioxy-1-chlorobutane gives 2′-hydroxy-2-[4″-(p-methoxyphenyl)-4″,4″-ethylenedioxy - n-butyl] - 5-methyl-9-ethyl-6,7-benzomorphan, m.p.: 140°–142° C.

IR$\nu_{Paraffin}^{cm.^{-1}}$: 2650, 2550, 1613, 1580, 1510, 1497, 1252, 1053, 1038, 836

Anal.—Calcd. for $C_{28}H_{37}NO_4$: C, 74.47; H, 8.26; N, 3.10%. Found: C, 74.69; H, 8.24; N, 3.43%.

(b) 2′-Hydroxy - 2-[γ-(p-methoxybenzoyl)-n-propyl]-5-methyl-9-ethyl-6,7-benzomorphan: By subjecting 2′-hydroxy-2-[4″-(p-methoxyphenyl) - 4″,4″ - ethylenedioxy-n-butyl]-5-methyl-9-ethyl-6,7-benzomorphan to the procedure of Example 5(b), there is produced a crude product, which is recrystallized from methanol-acetone to yield pure crystals of 2′-hydroxy-2-[γ-(p-methoxybenzoyl)-n-propyl]-5-methyl-9 - ethyl-6,7-benzomorphan hydrochloride, m.p.: 148°–150.0° C.

IR$\nu_{Paraffin}^{cm.^{-1}}$: 1675, 1612, 1598, 1570, 1510, 1504

Anal.—Calcd. for $C_{26}H_{34}NO_3Cl$: C, 70.33; H, 7.72; N, 3.15%. Found: C, 70.14; H, 7.77; N, 3.14%.

EXAMPLE 9

2′-Hydroxy-2-[δ-(p-fluorobenzoyl)-n-butyl]-5,9-dimethyl-6,7-benzomorphan

A mixture of 2.17 g. of 2′-hydroxy-5,9-dimethyl-6,7-benzomorphan, 1.26 g. of sodium bicarbonate, 3.88 g. of 5-(p-fluorophenyl)-5,5-ethylenedioxy-1-chloropentane and 30 ml. of dimethylformamide is stirred at 125°–130° C. for four hours. The mixture is concentrated under reduced pressure until the dimethylformamide has been removed, and water is added thereto and it is extracted with ether. The extract is washed with water, dried over anhydrous sodium sulfate, and filtered. The filtrate is concentrated under reduced pressure to dryness. The residue obtained is used without purification. To a mixture of 4.0 g. of crude 2′-hydroxy-2-[5″-(p-fluorophenyl)-5″,5″-ethylenedioxy-n-pentyl] - 5,9-dimethyl-6,7-benzomorphan, 50 ml. of methanol and 30 ml. of water is added 5 ml. of concentrated hydrochloric acid. The mixture is boiled for one hour, treated with decolorizing charcoal and hot-filtered. The filtrate is evaporated to dryness under reduced pressure. Trituration of the residue with ether gives crude 2′-hydroxy-2-[δ-(p-fluorobenzoyl) - n-butyl]-5,9-dimethyl-6,7-benzomorphan hydrochloride. Recrystallization from methanol-acetone affords pure crystals of 2′-hydroxy-2-[δ-(p-fluorobenzoyl) - n - butyl]-5,9-dimethyl-6,7-benzomorphan hydrochloride, m.p.: 229°–231° C.

IR$\nu_{Paraffin}^{cm.^{-1}}$: 2675, 1680, 1608, 1590, 1498, 1215, 1200, 1160, 993, 845

Anal.—Calcd. for $C_{25}H_{31}NO_2ClF$: C, 69.51; H, 7.25; N, 3.24; Cl, 8.21%. Found: C, 69.66; H, 7.38; N, 3.27; Cl, 8.13%.

EXAMPLE 10

2′-Hydroxy-2-[δ-(p-methoxybenzoyl)-n-butyl]-5,9-dimethyl-6,7-benzomorphan (a) 2′-Hydroxy - 2 - [5″-(p-methoxyphenyl)-5″,5″-ethylenedioxy-n-pentyl] - 5,9 - dimethyl - 6,7 - benzomorphan: According to the procedure of Example 9, but using 5 - (p-methoxyphenyl)-5,5-ethylenedioxy-1-chloropentane, there is produced 2′-hydroxy-2-5″-(p-methoxyphenyl) - 5″,5″ - ethylenedioxy-n-pentyl]-5,9-dimethyl-6,7-benzomorphan, m.p.: 175°–177° C.

IR$\nu_{Paraffin}^{cm.^{-1}}$: 2600, 1620, 1597, 1574, 1497, 1179, 1038, 978, 850, 808

Anal.—Calcd. for $C_{28}H_{37}NO_4$: C, 74.47; H, 8.26; N, 3.10%. Found: C, 74.63; H, 8.10; N, 3.17%.

(b) 2′ - Hydroxy - 2-[δ-(p-methoxybenzoyl)-n-butyl]-5,9-dimethyl -6,7 - benzomorphan: Following the procedure of Example 9, but using 2′ - hydroxy - 2-[5″-(p-methoxyphenyl) 5″,5″ - ethylenedioxy-n-pentyl]-5,9-dimethyl-6,7-benzomorphan, there is obtained a crude product which is recrystallized from n-butanol to yield pure 2′ - hydroxy - 2 - [δ-(p-methoxybenzoyl)-n-butyl]-5,9-dimethyl-6,7-benzomorphan, m.p.: 181°–182° C.

IR$\nu_{Paraffin}^{cm.^{-1}}$: 2600, 1668, 1592, 1569, 1495, 1169, 1032, 971, 844, 800

Anal.—Calcd. for $C_{26}H_{33}NO_3$: C, 76.62; H, 8.61; N, 3.44%. Found: C, 76.19; H, 8.48; N, 3.60%.

EXAMPLE 11

2-Hydroxy-2-[γ-(3,4-dimethoxybenzoyl)-n-propyl]-5,9-dimethyl-6,7-benzomorphan (a) 2′ - Hydroxy - 2 - [4″ - (3,4-dimethoxyphenyl)-4″,4″ - ethylenedioxy-n-butyl] - 5,9 - dimethyl - 6,7-benzomorphan: According to the procedure of Example 1(a), the reaction of 1.52 g. of 2′-hydroxy-5,9-dimethyl-6,7-benzomorphan with 2.2 g. of 4-(3′,4′ - dimethoxyphenyl)-4,4 - ethylenedioxy - 1 - chlorobutane gives 2′-hydroxy - 2 - [4″ - (3,4-dimethoxyphenyl)-4″,4″-ethylenedioxy-n-butyl]-5,9-dimethyl - 6,7-benzomorphan, m.p.s 162°–163° C.

IR$\nu_{Paraffin}^{cm.^{-1}}$: 2650, 1618, 1580, 1510, 1024, 800, 766

Anal.—Calcd. for $C_{28}H_{37}NO_5$: C, 71.92; H, 7.98; N, 3.00%. Found: C, 71.96; H, 7.82; N, 2.93%.

(b) 2′ - Hydroxy - 2 - [γ-(3,4-dimethoxybenzoyl)-n-propyl] - 5,9 - dimethyl-6,7-benzomorphan: According to the procedure of Example 1(b), 2′-hydroxy-2-[4″-(3,4-dimethoxyphenyl) - 4″,4″ - ethylenedioxy-n-butyl]-5,9-dimethyl-6,7-benzomorphan is converted to 2′-hydroxy-2-[γ - (3,4 - dimethoxybenzoyl)-n-propyl]-5,9-dimethyl-6,7-benzomorphan, m.p.: 156°–158° C.

IR$\nu_{Paraffin}^{cm.^{-1}}$: 2650, 1660, 1615, 1580, 1510, 1030, 799, 767

Anal.—Calcd. for $C_{26}H_{33}NO_4$: C, 73.73; H, 7.85; N. 3.31%. Found: C, 74.03; H, 8.13; N, 3.57%.

EXAMPLE 12

2′-Hydroxy-2-[γ-(3-fluoro-4-methylbenzoyl)-n-propyl]-5,9-dimethyl-6,7-benzomorphan According to the procedure of Example 9, but using 4-(3 - fluoro - 4 - methylphenyl)-4,4-ethylenedioxy-1-chlorobutane, there is produced 2′ - hydroxy - 2-[γ-(3-fluoro - 4 - methylbenzoyl)-n-propyl] - 5,9-dimethyl-6,7-benzomorphan, m.p.: 131°–134° C.

IR$\nu_{Paraffin}^{cm.^{-1}}$: 2600, 1685, 1609, 1576, 1493, 1240, 758

Anal.—Calcd. for $C_{25}H_{30}NO_2F$: C, 75.92; H, 7.65; N, 3.54%. Found: C, 75.93; H, 7.48; N, 3.51%.

EXAMPLE 13

2′-Hydroxy-2-[γ-(p-methylthiobenzoyl)-n-propyl]-5,9-dimethyl-6,7-benzomorphan

Following the procedure of Example 7, but using 4-(p-methylthiophenyl) - 4,4-ethylenedioxy-1-chlorobutane, there is obtained a crude product which is recrystallized from ethyl acetate to yield pure 2′ - hydroxy-2-[γ-(p- methylthiobenzoyl)-n-propyl] - 5,9 - dimethyl-6,7-benzomorphan, m.p.: 154°–156° C.

IR$\nu_{Paraffin}^{cm.^{-1}}$: 2600, 1678, 1615, 1586, 1236, 1090, 802

Anal.—Calcd. for $C_{25}H_{31}NO_2S$: C, 73.31; H, 7.63; N, 7.42; S, 7.83%. Found: S, 73.68; H, 7.65; N, 3.4%; S, 7.88%.

EXAMPLE 14

2'-Hydroxy-2-[γ-(o-methoxybenzoyl)-n-propyl]-5,9-dimethyl-6,7-benzomorphan

Alternatively the 2'-hydroxy-2-[γ-(o-methoxybenzoyl)-n-propyl]-5,9-dimethyl-6,7-benzomorphan is obtained by the procedure of Example 5. m.p.: 132°–137° C.

IR$\nu_{Paraffin}^{cm.^{-1}}$: 1675, 1620, 1602, 1583, 765

Anal.—Calcd. for $C_{25}H_{31}NO_3$: C, 76.30; H, 7.94; N, 3.56%. Found: C, 76.37; H, 7.82; N, 3.48%.

EXAMPLE 15

2'-Hydroxy-2-[γ-(o-methoxybenzoyl)-n-propyl]-5-methyl-9-ethyl-6,7-benzomorphan (a) 2' - Hydroxy-2-[4''-(o-methoxyphenyl) - 4'',4''-ethylenedioxy-n-butyl]-5-methyl-9-ethyl - 6,7 - benzomorphan: To a mixture of 1.73 g. of 2'-hydroxy-5-methyl-9-ethyl-6,7-benzomorphan, 0.9 g. of sodium bicarbonate and 20 ml. of dimethylformamide is added 2.0 g. of 4-(o-methoxyphenyl)-4,4-ethylenedioxy-1-chlorobutane. The resultant mixture is stirred at 140°–145° C. for 4 hours. The solvent is removed under reduced pressure to residue, to which is added water. The mixture is extracted with ether. The ether extracts are concentrated to dryness to give the crude compound. Recrystallization from ethyl acetate gives 2'-hydroxy-2-[4''-(o-methoxyphenyl)-4'',4''-ethylenedioxy-n-butyl]-5-methyl-9-ethyl - 6,7 - benzomorphan, m.p. 157.5°–159° C.

IR$\nu_{Paraffin}^{cm.^{-1}}$: 1610, 1600, 1582, 1500, 752

Anal.—Calcd. for $C_{28}H_{37}NO_4$: C, 74.47; H, 8.26; N, 3.10%. Found: C, 74.37; H, 8.18; N, 3.18%.

(b) 2' - Hydroxy-2-[γ-(o-methoxybenzoyl)-n-propyl]-5-methyl-9-ethyl-6,7-benzomorphan: A mixture of 2.5 g. of 2' - hydroxy-2-[4''-(o-methoxyphenyl)-4'',4''-ethylenedioxy-n-butyl]-5-methyl-9-ethyl - 6,7 - benzomorphan, 20 ml. of methanol, 10 ml. of water and 1.5 ml. of concentrated hydrochloric acid is refluxed for 1 hour. After the reaction mixture is concentrated under reduced pressure, the mixture is made alkaline with an aqueous ammonia, and is extracted with ether. The ether extracts are washed with water, dried over anhydrous sodium sulfate, and filtered. The filtrate is concentrated to dryness to give the crude compound. Recrystallization from acetone gives 2'-hydroxy-2-[γ-(o-methoxybenzoyl)-n-propyl] - 5 - methyl-9-ethyl-6,7-benzomorphan, m.p.: 148°–152° C.

IR$\nu_{Paraffin}^{cm.^{-1}}$: 1670, 1612, 1595, 1578, 759

Anal.—Calcd. for $C_{26}H_{33}NO_3$: C, 76.62; H, 8.16; N, 3.44%. Found: C, 76.81; H, 8.27; N, 3.43%.

EXAMPLE 16

2'-Hydroxy-2-[γ-(2,5-dimethylbenzoyl)-n-propyl]-5-methyl-9-ethyl-6,7-benzomorphan (a) 2 - Hydroxy-2-[4''-(2,5-dimethylphenyl) - 4'',4''-ethylenedioxy-n-butyl]-5-methyl-9-ethyl - 6,7 - benzomorphan: According to the procedure of Example 1(a), but using 4-(2',5'-dimethylphenyl) - 4,4 - ethylenedioxy - 1-chlorobutane, there is produced 2'-hydroxy-2-[4''-(2,5-dimethylphenyl)-4'',4''-ethylenedioxy-n-butyl] - 5 - methyl-9-ethyl-6,7-benzomorphan, m.p.: 162°–164° C.

IR$\nu_{Paraffin}^{cm.^{-1}}$: 1615, 1580, 1498, 1085, 1060

Anal.—Calcd. for $C_{29}H_{39}NO_3$: C, 77.46; H, 8.74; N, 3.12%. Found: C, 77.43; H, 8.75; N, 3.10%.

(b) 2' - Hydroxy-2-[γ-(2,5-dimethoxybenzoyl)-n-propyl]-5-methyl-9-ethyl-6,7-benzomorphan: Following the procedure of Example 1(b), but using 2'-hydroxy-2-[4''-(2,5-dimethylphenyl)-4'',4''-ethylenedioxy - n - butyl]-5-methyl-9-ethyl - 6,7 - benzomorphan, there is obtained a crude product which is recrystallized from acetone to yield pure 2' - hydroxy-2-[γ-(2,5-dimethylbenzoyl)-n-propyl]-5-methyl-9-ethyl - 6,7 - benzomorphan, m.p.: 152°–155° C.

IR$\nu_{Paraffin}^{cm.^{-1}}$: 1690, 1615, 1585, 1495, 1238, 819, 790

Anal.—Calcd. for $C_{27}H_{35}NO_2$: C, 79.96; H, 8.70; N, 3.45%. Found: C, 80.11; H, 8.72; N, 3.42%.

EXAMPLE 17

2'-Hydroxy-2-[γ-(m-nitrobenzoyl)-n-propyl]-5,9-dimethyl-6,7-benzomorphan

By subjecting 4-(m-nitrophenyl)-4,4-ethylenedioxy - 1-chlorobutane to the procedure of Example 7, there is obtained 2'-hydroxy-2-[γ-(m-nitrobenzoyl)-n-propoyl]-5,9-dimethyl-6,7-benzomorphan, m.p.: 168.5°–173° C.

IR$\nu_{Paraffin}^{cm.^{-1}}$: 1695, 1610, 1582, 1528, 1345

Anal.—Calcd. for $C_{24}H_{28}N_2O_4$: C, 70.56; H, 6.91; N, 6.86%. Found: C, 69.56; H, 6.75; N, 6.33%.

EXAMPLE 18

2'-Hydroxy-2-(γ-benzoyl-n-propyl)-5-methyl-9-ethyl-6,7-benzomorphan

To a mixture of 1.15 g. of 2'-hydroxy-5-methyl-9-ethyl-6,7-benzomorphan, 0.63 g. of sodium bicarbonate and 20 ml. of dimethylformamide is added 1.4 g. of γ-chlorobutyrophenone. The resultant mixture is stirred at 125°–133° C. for 2 hours. The inorganic solid produced is removed by filtration, and the filtrate is concentrated to dryness. The residue is washed with acetone and filtered. The mother liquor is allowed to stand in a refrigerator, and a precipitate is obtained. Recrystallization from ethyl acetate gives 2'-hydroxy-2-(γ-benzoyl-n-propyl)-5-methyl-9-ethyl - 6,7 - benzomorphan, m.p.: 168°–170° C.

IR$\nu_{Paraffin}^{cm.^{-1}}$: 2650, 1683, 1615, 1592, 1575, 921, 856, 792, 741, 688

Anal.—Calcd for $C_{25}H_{31}NO_2$: C, 79.53; H, 8.28; N, 3.71%. Found: C, 79.11; H, 8.63; N, 4.14%.

EXAMPLE 19

2'-Hydroxy-2-(γ-benzoyl-n-propyl)-5,9-dimethyl-6,7-benzomorphan

According to the procedure of Example 18, the reaction of 2' - hydroxy - 5,9-dimethyl-6,7-benzomorphan with γ - chlorobutyrophenon gives 2' - hydroxy - 2-(γ-benzoyl-n-propyl)-5,9-dimethyl-6,7-benzomorphan.

This compound is also prepared according to the procedure of Example 1. m.p.: 172°–174° C.

IR$\nu_{Paraffin}^{cm.^{-1}}$: 2600, 1685, 1615, 1594, 1578, 1495, 865, 742, 691

Anal.—Calcd. for $C_{24}H_{29}NO_2$: C, 79.30; H, 8.04; N, 3.85%. Found: C, 79.23; H, 7.85; N, 3.91%.

EXAMPLE 20

β-2'-Hydroxy-2-[γ-(p-fluorobenzoyl)-n-propyl]-5,9-dimethyl-6,7-benzomorphan

A mixture of 0.41 g. of β-2'-hydroxy-5,9-dimethyl-6,7-benzomorphan, 0.24 g. of sodium bicarbonate, 0.46 g. of 4 - (p - fluorophenyl)-4,4-ethylenedioxy-1-chlorobutane and 10 ml. of dimethylformamide is stirred at 110°–150° C. for three hours. This reaction mixture is concentrated under reduced pressure until most of the dimethylformamide has been removed, and water is added thereto and it is extracted with ether. The ether extract is washed with water, dried over anhydrous sodium sulfate, and filtered. The filtrate is concentrated under reduced pressure to give β - 2'-hydroxy-2-[4''-(p-fluorophenyl) - 4'',4''-ethylenedioxy-n-butyl]-5,9-dimethyl-6,7-benzomorphan as a yellow oil.

$IR\nu_{liq.}^{cm.^{-1}}$: 1603, 1590, 1500, 1220, 1040, 840

To a mixture of 0.78 g. of β-2'-hydroxy-2-[4''-(p-fluorophenyl) - 4'',4'' - ethylenedioxy - n-butyl]-5,9-dimethyl-6,7-benzomorphan, 5 ml. of methanol and 4 ml. of water is added 0.75 ml. of concentrated hydrochloric acid. The mixture is refluxed for one hour. The reaction mixture is concentrated under reduced pressure to remove the methanol, made alkaline with an aqueous ammonia and extracted with ether. The ether extract is washed with water, dried over anhydrous sodium sulfate, filtered and concentrated to an amorphous residue. This residue is chromatographed on a silica gel column with ethyl acetate to give the crude product. This compound is recrystallized from ethyl acetate to yield β-2'-hydroxy-2 - [γ - (p - fluorobenzoyl)-n-propyl]-5,9-dimethyl-6,7-benzomorphan, m.p.: 133.5°–135.0° C.

$IR\nu_{Paraffin}^{cm.^{-1}}$: 1680, 1604, 1592, 1500

Anal.—Calcd. for $C_{24}H_{28}NO_2F$: C, 75.56; H, 7.40; N, 3.67%. Found: C, 75.53; H, 7.35; N, 3.58%.

EXAMPLE 21

β-2-[γ-(p-Fluorobenzoyl)-n-propyl]5,9-dimethyl-6,7-benzomorphan

A mixture of 0.76 g. of β - 5,9-dimethyl-6,7-benzomorphan, 0.5 g. of sodium bicarbonate, 0.92 g. of 4-(p-fluorophenyl) - 4,4-ethylenedioxy-1-chlorobutane and 10 ml. of dimethylformamide is stirred at 130°–150° C. for 3.5 hours. The solvent is removed under reduced pressure to a residue, to which is added water. The mixture is extracted with ether. The ether extract is washed with water saturated with sodium chloride, dried over anhydrous sodium sulfate, and filtered. The filtrate is concentrated to give β - 2-[4''-(p-fluorophenyl)-4'',4''-ethylenedioxy-n-butyl]-5,9-dimethyl-6,7-benzomorphan.

$IR\nu_{liq.}^{cm.^{-1}}$: 1600, 1502, 1220, 1040

A mixture of 1.3 g. of β-2-[4''-(p-fluorophenyl)-4'',4''-ethylenedioxy - n-butyl]-5,9-dimethyl-6,7-benzomorphan, 15 ml. of methanol, 10 ml. of water and 2 ml. of concentrated hydrochloric acid is refluxed for one hour, and treated with charcoal and filtered. After the filtrate is concentrated under reduced pressure, it is made alkaline with an aqueous ammonia and extracted with ether. The ether extract is washed with water, dried over anhydrous sodium sulfate, filtered and concentrated to a residue. This residue is chromatographed on a silica gel column with chloroform to give the product. This base is converted to the hydrochloride by contacting with dry gaseous hydrogen chloride. This hydrochloride is recrystallized from acetone-ethyl acetate to yield β-2-[γ-(p-fluorobenzoyl) - n - propyl]-5,9-dimethyl-6,7-benzomorphan hydrochloride, m.p.: 209.5°–210.5° C.

$IR\nu_{Paraffin}^{cm.^{-1}}$: 2400 (broad), 1690, 1595, 1228, 1210, 1158, 838

Anal.—Calcd. for $C_{24}H_{29}NOFCl$: C, 71.71; H, 7.27; N, 3.48%. Found: C, 71.94; H, 7.28; N, 3.22%.

EXAMPLE 22

α-2'-Hydroxy-2-[γ-(m-fluorobenzoyl)n-propyl]-5,9-dimethyl-6,7-benzomorphan (a) α - 2' - Hydroxy-2-[4''-(m-fluorophenyl)-4'',4''-ethylenedioxy - n-butyl]-5,9-dimethyl-6,7-benzomorphan: According to the procedure of Example 1(a), but using 1.15 g. of α-2'-hydroxy-5,9-dimethyl-6,7-benzomorphan, 0.7 g. of sodium bicarbonate, 1.4 g. of 4 - (m-fluorophenyl)-4,4-ethylenedioxy-1-chlorobutane and 10 ml. of dimethylformamide, there is produced α - 2'-hydroxy-2-[4'' - (m-fluorophenyl)-4'',4''-ethylenedioxy-n-butyl]-5,9-dimethyl-6,7-benzomorphan, m.p.: 172°–181° C.

$IR\nu_{Paraffin}^{cm.^{-1}}$: 1610, 1585, 1578

(b) α-2'-Hydroxy-2-[γ-(m-fluorobenzoyl)-n-propyl]-5,9 - dimethyl-6,7-benzomorphan: According to the procedure of Example 1(b), but using 1.7 g. of α-2'-hydroxy-2 - [4'' - (m-fluorophenyl)-4'',4''-ethylenedioxy-n-butyl]-5,9 - dimethyl - 6,7-benzomorphan, there is produced a crude compound, m.p.: 164°–169° C., which is recrystallized from acetone to give pure crystals of α-2'-hydroxy - 2 - [γ - (m-fluorobenzoyl)-n-propyl]-5,9-dimethyl-6,7-benzomorphan, m.p.: 167°–170° C.

$IR\nu_{Paraffin}^{cm.^{-1}}$: 1680, 1613, 1582

Anal.—Calcd. for $C_{24}H_{28}NO_2F$: C, 75.56; H, 7.40; N, 3,67%. Found: C, 75.02; H, 7.97; N, 3.85%.

EXAMPLE 23

α-2'-Hydroxy-2-[γ-(m-trifluoromethylbenzoyl)-n-propyl]-5,9-dimethyl-6,7-benzomorphan Following the procedure of Example 7, but using 4-(m-trifluoromethylphenyl) - 4,4 - ethylenedioxy-1-chlorobutane, there is obtained a crude product which is recrystallized from ethyl acetate-isopropyl ether to yield pure α-2'-hydroxy - 2 - [γ-(m-trifluoromethylbenzoyl)-n-propyl] - 5,9 - dimethyl - 6,7 - benzomorphan, m.p.: 137°–139° C.

$IR\nu_{Paraffin}^{cm.^{-1}}$: 1695

Anal.—Calcd. for $C_{25}H_{28}NO_2F_3$: C, 69.59; H, 6.54; N, 3.25%. Found: C, 69.59; H, 6.48; N, 3.24%.

EXAMPLE 24

α-2'-Methoxy-2-[γ-(p-fluorobenzoyl)-n-propyl]-5,9-dimethyl-6,7-benzomorphan

According to the procedure of Example 23, the reaction of α-2'-methoxy - 5,9 -dimethyl - 6,7 - benzomorphan (2.31 g.) with 2.7 g. of 4-(p-fluorophenyl) - 4,4 - ethylenedioxy - 1 - chlorobutane gives α-2'-methoxy-2-[γ-(p-fluorobenzoyl)-n-propyl] - 5,9 - dimethyl - 6,7 - benzomorphan hydrochloride, m.p.: 144°–152° C. (hygroscopic prism).

$IR\nu_{Paraffin}^{cm.^{-1}}$: 3400, (broad), 2500 (broad), 1690, 1610, 1595

EXAMPLE 25

2'-Hydroxy-2-[γ-(p-fluorobenzoyl)-n-propyl]-5-methyl-6,7-benzomorphan (a) 2'-Hydroxy - 2 - [4''-(p-fluorophenyl)-4'',4''-ethylenedioxy-n-butyl] - 5 - methyl - 6,7 - benzomorphan: A mixture of 0.8 g. of 2'-hydroxy - 5 - methyl-6,7-benzomorphan, 0.5 g. of sodium bicarbonate, 1.06 g. of 4-(p-fluorophenyl) - 4,4 - ethylenedioxy - 1 - chlorobutane and 15 ml. of dimethylformamide is stirred at 130°–155° C. for 3.5 hours. The precipitate produced is filtered off. The filtrate is concentrated under reduced pressure to remove the dimethylformamide, and water is added thereto and it is extracted with ether. The extracts are washed, dried over anhydrous sodium sulfate and filtered. The filtrate is concentrated to dryness to give 2'-hydroxy-2-[4''-(p-fluorophenyl) - 4'',4'' - ethylenedioxy-n-butyl]-5-methyl-6,7-benzomorphan, as a viscous liquid.

$IR\nu_{liquid}^{cm.^{-1}}$: 1600, 1580, 1505, 1220, 1155, 1040, 840

(b) 2'-Hydroxy - 2 - [γ-(p-fluorobenzoyl)-n-propyl]-5-methyl - 6,7 - benzomorphan: A mixture of 1.7 g. of 2'-hydroxy - 2 - [4''-(p-fluorophenyl) - 4'',4''-ethylenedioxy - n - butyl] - 5 - methyl - 6,7 - benzomorphan, 8 ml. of methanol, 4 ml. of water and 0.8 ml. of methanol, 4 ml. of water and 0.8 ml. of concentrated hydrochloric acid is stirred at 79°–81° C. for one hour, and treated with 0.05 g. of decolorizing charcoal and filtered. After the filtrate is concentrated under reduced pressure to remove the methanol, it is made alkaline with an aqueous ammonia and extracted with ether. The extracts are concentrated to dryness to give the crude product, which is recrystallized from acetone to yield 2'-hydroxy - 2 - [γ-(p-fluorobenzoyl)-n-propyl]-5-methyl-6,7-benzomorphan, m.p.: 169.5–171.5° C.

$IR \nu_{Paraffin}^{cm.^{-1}}$: 1690, 1600, 1505

Anal.—Calcd. for $C_{23}H_{26}NO_2F$: C, 75.17; H, 7.13; N, 3.81%. Found: C, 74.93; H, 7.15; N, 3.77%.

EXAMPLE 26

2-[γ-(p-Fluorobenzoyl)-n-propyl]-5-methyl-6,7-benzomorphan (a) 2-[4''-(p-Fluorophenyl) - 4'',4'' - ethylenedioxy-n-butyl] - 5 - methyl - 6,7 - benzomorphan: A mixture of 1.87 g. of 5-methyl-6,7-benzomorphan, 1.0 g. of sodium bicarbonate, 2.45 g. of 4-(p-fluorophenyl) - 4,4 - ethylenedioxy - 1 - chlorobutane and 20 ml. of dimethylformamide is stirred at 110°–145° C. for 4 hours. This mixture is concentrated under reduced pressure until most of the dimethylformamide has been removed, and water is added thereto. The mixture is extracted several times with benzene. The extracts are washed with water, dried over anhydrous sodium sulfate, and filtered. The filtrate is concentrated under reduced pressure to give 2-[4''-(p-fluorophenyl) - 4'',4'' - ethylenedioxy-n-butyl]-5-methyl-6,7-benzomorphan.

$IR \nu_{liquid}^{cm.^{-1}}$: 1600, 1502, 1220, 1158, 1040, 840, 760, 680

(b) 2-[γ-(p-Fluorobenzoyl)-n-propyl] - 5 - methyl-6,7-benzomorphan: To a mixture of 3.6 g. of 2-[4''-(p-fluorophenyl) - 4'',4'' - ethylenedioxy-n-butyl] - 5 - methyl-6,7-benzomorphan, 40 ml. of methanol and 15 ml. of water is added 5 ml. of concentrated hydrochloric acid. After the resultant mixture is refluxed for 1 hour, it is treated with charcoal and filtered. The filtrate is concentrated under reduced pressure to residue, which is made alkaline with an aqueous ammonia and extracted with dichloromethane. The extract is washed with water, dried over anhydrous sodium sulfate and filtered. The filtrate is concentrated to a residue, which is distilled under reduced pressure to yield 2-[γ-(p-fluorobenzoyl)-n-propyl] - 5 - methyl-6,7-benzomorphan, b.p.: 170°198° C./0.3 mm. Hg.

$IR \nu_{liq.}^{cm.^{-1}}$: 1678, 1592, 1230, 1156, 837, 760

This free base is converted to the hydrochloride by contacting with dry gaseous hydrogen chloride. Recrystallization from acetone-methanol gives 2-[γ-(p-fluorobenzoyl)-n-propyl] - 5 - methyl - 6,7 - benzomorphan hydrochloride, m.p.: 219°–220° C.

$IR \nu_{Paraffin}^{cm.^{-1}}$: 1688, 1600

Anal.—Calcd. for $C_{23}H_{27}NOFCl$: C, 71.21; H, 7.01; N, 3.61%. Found: C, 71.20; H, 6.98; N, 3.51%.

EXAMPLE 27

2-(γ-Benzoyl-n-propyl)-5-methyl-6,7-benzomorphan

To a mixture of 0.47 g. of 5-methyl-6,7-benzomorphan, 0.3 g. of sodium bicarbonate and 10 ml. of dimethylformamide is added 0.46 g. of γ-chlorobutylophenone. The resultant mixture is stirred at 130°–160° C. for 4 hours, concentrated to remove the dimethylformamide and water is added thereto. The mixture is extracted with ether. The ether extracts are washed, dried and filtered. The filtrate is treated with charcoal and concentrated to a residue. This residue is converted to the hydrochloride by contacting with dry gaseous hydrogen chloride. The hydrochloride is recrystallized from acetone-ethyl acetate to give 2-(γ-benzoyl-n-propyl)-5-methyl - 6, 7 - benzomorphan hydrochloride, m.p.: 218°–221° C.

$IR \nu_{Paraffin}^{cm.^{-1}}$: 2500 (broad), 1685, 1598, 1580, 1212

EXAMPLE 28

2'-Hydroxy-2-[γ-(p-fluorobenzoyl)-n-propyl]-6,7-benzomorphan (a) 2'-Hydroxy - 2 - [4'' - (p - fluorophenyl)-4'',4''-ethylenedioxy - n - butyl] - 6,7 - benzomorphan: To a mixture of 0.45 g. of 2' - hydroxy - 6,7 - benzomorphan, 0.3 g. of sodium bicarbonate and 10 ml. of dimethylformamide is added 0.64 g. of 4 - (p-fluorophenyl) - 4,4 - ethylenedioxy-1-bromobutane. The resultant mixture is stirred at 130°–150° C. for 3.5 hours. After the precipitate produced is filtered off, the filtrate is concentrated to remove the dimethylformamide and water is added thereto. The mixture is extracted with ether. The ether extracts are concentrated to dryness to yield 2'-hydroxy-2-[4''-(p-fluorophenyl) - 4'',4'' - ethylenedioxy - n - butyl]-6,7-benzomorphan as an oil.

$IR \nu_{liquid}^{cm.^{-1}}$: 1600, 1505, 1225, 1160, 1050, 840

(b) 2' - Hydroxy - 2 - [γ-(p-fluorobenzoyl)-n-propyl]-6,7-benzomorphan: A mixture of 1.05 g. of 2'-hydroxy-2-[4''-(p-fluorophenyl) - 4'',4'' - ethylenedioxy-n-butyl]-6,7-benzomorphan, 5 ml. of methanol, 2.5 ml. of water and 0.5 ml. of concentrated hydrochloric acid is stirred at 82°–97° C. for one hour, and is treated with 0.03 g. of charcoal and filtered. After the filtrate is concentrated to remove the methanol, it is made alkaline with an aqueous ammonia and extracted with ether. The ether extract is concentrated to a residue, which is crystallized from acetone. Recrystallization from acetone gives 2'-hydroxy-2-[γ-(p-fluorobenzoyl) - n - propyl] - 6,7 - benzomorphan, m.p.: 165.5°–169.5° C.

$IR \nu_{Paraffin}^{cm.^{-1}}$: 1680, 1600, 1503

Anal.—Calcd. for $C_{22}H_{24}NO_2F$: C, 74.76; H, 6.84; N, 3.96%. Found: C, 75.08; H, 6.64; N, 4.09%.

EXAMPLE 29

2-[γ-(p-Fluorobenzoyl)-n-propyl]-6.7-benzomorphan (a) 2 - [4'' - (p-Fluorophenyl)-4'',4''-ethylenedioxy-n-butyl]-6,7-benzomorphan: A mixture of 1.7 g. of 6,7-benzomorphan, 2.5 g. of 4-(p-fluorophenyl)-4,4-ethylenedioxy-1-chlorobutane, 1.01 g. of sodium bicarbonate and 20 ml. of dimethylformamide is stirred at 125°–155° C. for 3.5 hours. The mixture is concentrated under reduced pressure until most of the solvent has been removed, and water is added thereto. The mixture is extracted several times with ether. The combined extracts are washed with water saturated with sodium chloride, dried over anhydrous sodium sulfate and filtered. The filtrate is concentrated to give 2 - [4'' - (p - fluorophenyl)-4'',4''-ethylenedioxy-n-butyl]-6,7-benzomorphan as a liquid. $n_D^{24}$: 1.5459.

$IR \nu_{liq.}^{cm.^{-1}}$: 1602, 1503, 1222, 1040, 839

(b) 2 - [γ - (p - Fluorobenzoyl)-n-propyl]-6,7-benzomorphan: To a mixture of 3.5 g. of 2-[4''-(p-fluorophenyl) - 4'',4'' - ethylenedioxy - n - butyl]-6,7-benzomorphan, 50 ml. of methanol and 15 ml. of water is added 5 ml. of concentrated hydrochloric acid. After the resultant mixture is refluxed for one hour, the mixture is concentrated under reduced pressure to residue, which is made alkaline with an aqueous ammonia and extracted with ether. The ether extract is washed with water, dried over anhydrous sodium sulfate, and filtered. The filtrate is concentrated to a residue, which is converted to the hydrochloride to give 2 - [γ - (p - fluorobenzoyl)-n-propyl]-

6,7-benzomorphan hydrochloride, m.p.: 209°–211° C. (methanol-acetone).

IR$\nu_{\text{Paraffin}}^{\text{cm.}^{-1}}$: 2580, 1683, 1600, 1235, 1220, 1163, 850, 775

Anal.—Calcd. for $C_{22}H_{25}NOFCl$: C, 70.67; H, 6.74; N, 3.74%. Found: C, 71.00; H, 6.97; N, 3.83%.

EXAMPLE 30

2-[γ-(p-Methoxybenzoyl)-n-propyl]-6,7-benzomorphan (a) 2 - [4″ - (p - Methoxyphenyl) - 4″,4″ - ethylenedioxy-n-butyl]-6,7-benzomorphan: According to the procedure of Example 28(a), the reaction of 1.62 g. of 6,7-benzomorphan with 2.4 g. of 4 - (p - methoxyphenyl)-4,4-ethylenedioxy-1-chlorobutane gives 2 - [4″-(p-methoxyphenyl) - 4″,4″ - ethylenedioxy - n - butyl]-6,7-benzomorphan as a liquid. $n_D^{20}$: 1.5600.

IR$\nu_{\text{liq.}}^{\text{cm.}^{-1}}$: 1600, 1505, 1243, 1167, 1030, 830, 762

(b) 2 - [γ - (p - Methoxybenzoyl) - n - propyl]-6,7-benzomorphan: According to the procedure of Example 28(b), 2 - [4″ - (p - methoxyphenyl) - 4″,4″ - ethylenedioxy - n - butyl] - 6,7 - benzomorphan converts to 2-[γ-(p - methoxybenzoyl) - n - propyl] - 6,7 - benzomorphan hydrochloride, m.p.: 211.5°–213° C. (acetone-methanol).

IR$\nu_{\text{Paraffin}}^{\text{cm.}^{-1}}$: 2500, 1670, 1600, 1575, 1250, 1220, 1179, 1020

Anal.—Calcd. for $C_{23}H_{28}NO_2Cl$: C, 71.58; H, 7.31; N, 3.63%. Found: C, 71.65; H, 7.45; N, 3.58%.

EXAMPLE 31

α-2′-Nitro-2-[γ-(p-fluorobenzoyl)-n-propyl]-5,9-dimethyl-6,7-benzomorphan

A mixture of 2.46 g. of α-2′-nitro-5,9-dimethyl-6,7-benzomorphan, 20 ml. of dimethylformamide, 1.26 g. of sodium bicarbonate and 2.7 g. of 4-(p-fluorophenyl)-4,4-ethylenedioxy-1-chlorobutane is stirred at 130°–150° C. for 3.5 hours. The mixture is concentrated under reduced pressure until the dimethylformamide has been removed, and water is added thereto and it is extracted with ether. The extract is washed with water, dried over anhydrous sodium sulfate, and filtered. The filtrate is concentrated under reduced pressure to dryness. The residue obtained is used without purification. To a mixture of 4.8 g. of crude α-2′-nitro-2-[4″-(p-fluorophenyl)-4″,4″-ethylenedioxy-n-butyl]-5,9-dimethyl-6,7-benzomorphan, 25 ml. of methanol and 12 ml. of water is added 6 ml. of concentrated hydrochloric acid. The mixture is boiled for one hour, treated with decolorizing charcoal and filtered. After the filtrate is concentrated under reduced pressure, it is made alkaline with an aqueous ammonia and extracted with ether. The extract is washed with water, dried over anhydrous sodium sulfate, filtered and concentrated to a residue. This residue is converted to the hydrochloride. Recrystallization from acetone-methanol gives α-2′-nitro-2-[γ-(p-fluorobenzoyl)-n-propyl]-5,9-dimethyl - 6,7 - benzomorphan hydrochloride, m.p.: 222°–223° C. (decomp).

IR$\nu_{\text{Paraffin}}^{\text{cm.}^{-1}}$: 2400, 1680, 1520, 1340, 1230, 1160, 840, 820, 780, 750

Anal.—Calcd. for $C_{24}H_{28}N_2O_3FCl$: C, 64.50; H, 6.31; N, 6.27%. Found: C, 65.22; H, 6.52; N, 6.10%.

EXAMPLE 32

α-2′-Hydroxy-2-[γ-(p-fluorobenzoyl)-n-propyl]-5,8,9-trimethyl-6,7-benzomorphan (a) α-2′-Hydroxy - 2 - [4″-(p-fluorophenyl)-4″,4″-ethylenedioxy-n-butyl]-5,8,9-trimethyl-6,7-benzomorphan: A mixture of 0.6 g. of α-2′-hydroxy-5,8,9-trimethyl-6,7-benzomorphan, 0.26 g. of sodium bicarbonate, 0.64 g. of 4-(p-fluorophenyl)-4,4-ethylenedioxy-1-chlorobutane and 10 ml. of dimethylformamide is stirred at 130°–145° C. for 4 hours. The solvent is removed under reduced pressure to a residue, to which is added water. The mixture is extracted with ether. The extract is washed, dried and filtered. The filtrate is concentrated to give α-2′-hydroxy-2-[4″-(p-fluorophenyl)-4″,4″ - ethylenedioxy - n - butyl]-5,8,9-trimethyl-6,7-benzomorphan as an oil.

IR$\nu_{\text{liq.}}^{\text{cm.}^{-1}}$: 1602, 1578, 1500, 1220, 1158, 1120, 1040, 840

(b) α-2′-Hydroxy-2-[γ-(p-fluorobenzoyl) - n - propyl]-5,8,9-trimethyl-6,7-benzomorphan: To a mixture of 1.2 g. of α-2′-hydroxy-2-[4″-(p-fluorophenyl-4″,4″-ethylenedioxy-n-butyl]-5,8,9-trimethyl-6,7-benzomorphan, 15 ml. of methanol and 6 ml. of water is added 2 ml. of concentrated hydrochloric acid. After the resultant mixture is refluxed for 1 hour, it is concentrated under reduced pressure to a residue, which is made alkaline with excess aqueous ammonia and extracted with chloroform. The organic solution is washed with water, dried over anhydrous sodium sulfate, and filtered. The filtrate is concentrated to an amorphous residue. This residue is chromatographed on a silica gel column and on an aluminum oxide column with chloroform and ethyl acetate to give the crude product. This compound is recrystallized from ethyl acetate to yield α-2′-hydroxy-2-[γ-(p-fluorobenzoyl)-n - propyl] - 5,8,9 - trimethyl - 6,7 - benzomorphan, m.p.: 144.5°–146° C.

IR$\nu_{\text{Paraffin}}^{\text{cm.}^{-1}}$: 1690, 1620, 1595, 1582, 1500

Anal.—Calcd. for $C_{25}H_{30}NO_2F$: C, 75.92; H, 7.65; N, 3.54%. Found: C, 76.11; H, 7.56; N, 3.45%.

EXAMPLE 33

α-2′-Hydroxy-2-[β-(p-fluorobenzoyl)ethyl]-5,9-dimethyl-6,7-benzomorphan

To a solution of 4.0 g. of α-2′-hydroxy-5,9-dimethyl-6,7-benzomorphan in 45 ml. of dimethylformamide are added 2.32 g. of sodium bicarbonate and a solution of 4.67 g. of 3-(p-fluorophenyl)-3,3-ethylenedioxy-1-chloropropane in 20 ml. of dimethylformamide with stirring. The resultant mixture is refluxed for 7 hours and the precipitate formed is filtered off. The filtrate is concentrated to dryness to give α-2′-hydroxy-2-[3″-(p-fluorophenyl)-3″,3″ - ethylenedioxy - n - propyl]-5,9-dimethyl-6,7-benzomorphan, as a brown oil.

A mixture of 8.5 g. of α-2′-hydroxy-2-[3″-(p-fluorophenyl)-3″,3″ - ethylenedioxy - n - propyl]5,9-dimethyl-6,7-benzomorphan, 80 ml. of methanol, 40 ml. of water and 15 ml. of concentrated hydrochloric acid is refluxed for one hour. The reaction mixture is concentrated under reduced pressure to remove the methanol and made alkaline with an aqueous ammonia. The solution is extracted with ether. The ether extracts are washed, dried and filtered. The solvent is removed to give the crude oil, to which are added ether and ethyl acetate. The mixture is allowed to stand in a refrigerator, and a precipitate is obtained. Recrystallization from ethyl acetate gives α-2′-hydroxy-2-[β-(p - fluorobenzoyl)ethyl]-5,9-dimethyl-6,7-benzomorphan, m.p.: 156.5°–160° C.

IR$\nu_{\text{Paraffin}}^{\text{cm.}^{-1}}$: 2650, 2580, 1685, 1620, 1600, 1583

Anal.—Calcd. for $C_{23}H_{26}NO_2F$: C, 75.18; H, 7.13; N, 3.81%. Found: C, 74.29; H, 7.36; N, 3.38%.

EXAMPLE 34

2′-Hydroxy-2-[β-(p-fluorobenzoyl)ethyl]-6,7-benzomorphan

According to the procedure of Example 33, but using 3-(p-fluorophenyl)-3,3-ethylenedioxy - 1 - chloropropane, there is produced 2′-hydroxy - 2 - [β-(p-fluorobenzoyl) ethyl]-6,7-benzomorphan, m.p.: 155°–159° C.

IR$\nu_{\text{Paraffin}}^{\text{cm.}^{-1}}$: 2675, 2590, 1685, 1618, 1596, 1498

Anal.—Calcd. for $C_{21}H_{22}NO_2F$: C, 74.13; H, 6.53; N, 4.13%. Found: C, 75.00; H, 7.05; N, 4.54%.

EXAMPLE 35

α-2'-Hydroxy-2-(β-benzoylethyl)-5,9-dimethyl-6,7-benzomorphan

A mixture of 2.17 g. of α-2'-hydroxy-5,9-dimethyl-6,7-benzomorphan, 1.26 g. of sodium bicarbonate, 1.85 g. of β-chloropropiophenone and 50 ml. of dimethylformamide is stirred at 140° C. for 4 hours. The inorganic solid produced is removed by filtration, and the filtrate is concentrated to a residue, to which is added water. The mixture is allowed to stand in a refrigerator, and a precipitate is obtained. Recrystallization from acetone gives α-2'-hydroxy-2-(β-benzoylethyl) - 5,9 - dimethyl - 6,7 - benzomorphan, m.p.: 164°–167° C.

IR$\nu_{Paraffin}^{cm.^{-1}}$: 2600, 1682, 1615, 1597, 1580, 1496, 756, 697

Anal.—Calcd. for $C_{23}H_{27}NO_2$: C, 79.05; H, 7.79; N, 4.01%. Found: C, 79.04; H, 7.92; N, 4.55%.

EXAMPLE 36

2-[β-(p-Fluorobenzoyl)ethyl]-5-methyl-6,7-benzomorphan (a) 2-[3''-(p-Fluorophenyl) - 3'',3'' - ethylenedioxy-n-propyl] - 5 - methyl - 6,7 - benzomorphan: Following the procedure of Example 26(a), but using 3-(p-fluorophenyl)-3,3-ethylenedioxy-1-chloropropane, there is obtained 2-[3''-(p-fluorophenyl) - 3'',3'' - ethylenedioxy-n-propyl] - 5 - methyl - 6,7 - benzomorphan, as a viscous liquid.

IR$\nu_{liq.}^{cm.^{-1}}$: 1593, 1500, 830, 753, 716

(b) 2-[β-(p-Fluorobenzoyl)ethyl]-5-methyl-6,7-benzomorphan: According to the procedure of Example 26(b), but using 2-[3''-(p-fluorophenyl)-3'',3''-ethylenedioxy-n-propyl] - 5 - methyl - 6,7 - benzomorphan, there is produced 2 - [β-(p-fluorobenzoyl)ethyl]-5-methyl-6,7-benzomorphan hydrochloride, m.p.: 177°–178° C.

IR$\nu_{Paraffin}^{cm.^{-1}}$: 2430, 1676, 1595, 1221, 1052, 801, 762, 717

Anal.—Calcd. for $C_{22}H_{25}NOClF$: C, 70.67; H, 6.74; N, 3.75; Cl, 9.48%. Found: C, 70.72; H, 6.67; N, 3.80; Cl, 9.86%.

EXAMPLE 37

α-2'-Hydroxy-2-[β-(p-methoxybenzoyl)ethyl]-5,9-dimethyl-6,7-benzomorphan (a) α-2'-Hydroxy-2-[3'' - (p-methoxyphenyl) - 3'',3''-ethylenedioxy - n - propyl] - 5,9 - dimethyl - 6,7-benzomorphan: According to the procedure of Example 25(a), the reaction of 2.17 g. of α-2'-hydroxy-5,9-dimethyl-6,7-benzomorphan with 2.67 g. of 3-(p-methoxyphenyl)-3,3-ethylenedioxy - 1 - chloropropane gives α-2'-hydroxy - 2-[3''-(p-methoxyphenyl)-3'',3''-ethylenedioxy-n-propyl]-5,9-dimethyl-6,7-benzomorphan, m.p.: 165°–169° C.

IR$\nu_{Paraffin}^{cm.^{-1}}$: 2600, 1603, 1578, 1180, 795

(b) α-2'-Hydroxy - 2 - [β - (p - methoxybenzoyl)ethyl-5,9-dimethyl-6,7-benzomorphan: According to the procedure of Example 25(b), α-2'-hydroxy-2-[3''-(p-methoxyphenyl)-3'',3''-ethylenedioxy - n - propyl]-5,9-dimethyl-6,7-benzomorphan converts to α-2'-hydroxy - 2 - [β-(p-methoxybenzoyl)ethyl] - 5,9-dimethyl-6,7-benzomorphan, m.p.: 172°–175° C. (methanol-ethyl acetate).

IR$\nu_{Paraffin}^{cm.^{-1}}$: 2650, 1674, 1607, 1580, 1501, 1182, 796

Anal.—Calcd. for $C_{24}H_{27}NO_3$: C, 75.96; H, 7.70; N, 3.69%. Found: C, 75.71; H, 7.72; N, 3.73%.

EXAMPLE 38

α-2'-Hydroxy-2-[δ-(p-fluorobenzoyl)-n-propyl]-3',5,9-trimethyl-6,7-benzomorphan (a) α - 2' - Hydroxy - 2 - [4'' - (p - fluorophenyl)-4'',4'' - ethylenedioxy - n - butyl] - 3',5,9 - trimethyl-6,7-benzomorphan: To a mixture of 1.0 g. of α-2'-hydroxy-3',5,9-trimethyl-6,7-benzomorphan, 0.58 g. of sodium bicarbonate and 10 ml. of dimethylformamide is added 1.27 g. of 4-(p-fluorophenyl)-4,4-ethylenedioxy-1-chlorobutane. The mixture is stirred at 130°–145° C. for 4 hours and the precipitate formed is filtered off. The filtrate is concentrated to remove the dimethylformamide, and water is added thereto and it is extracted with ether. The extract is washed, dried and filtered. The solvent is removed to give the crude product. Recrystallization from methanol gives α-2'-hydroxy-2-[4''-(p-fluorophenyl)-4'',4''-ethylenedioxy-n-butyl]-3',5,9-trimethyl-6,7 - benzomorphan, m.p.: 166°–168° C.

IR$\nu_{Paraffin}^{cm.^{-1}}$: 2650, 1615, 1600, 1504, 1045, 957, 850

Anal.—Calcd. for $C_{27}H_{34}NO_3F$: C, 73.77; H, 7.80; N, 3.19%. Found: C, 73.44; H, 7.63; N, 3.03%.

(b) α - 2' - Hydroxy-2-[γ-(p-fluorobenzoyl)-n-propyl]-3',5,9-trimethyl-6,7-benzomorphan: A mixture of 0.9 g. of α-2'-hydroxy-2-[4'' - (p-fluorophenyl) - 4'',4''-ethylenedioxy-n-butyl] - 3',5,9 - trimethyl-6,7-benzomorphan, 20 ml. of methanol, 10 ml. of water and 1.5 ml. of concentrated hydrochloric acid is refluxed for 1 hour, treated with decolorizing charcoal and concentrated under reduced pressure to remove the methanol. The residual solution is made alkaline with an aqueous ammonia and extracted with ether. The extract is washed, dried, filtered and concentrated to dryness. This free base is converted to hydrochloride and recrystallization from methanol-acetone gives α - 2' - hydroxy-2-[γ-(p-fluorobenzoyl)-n-propyl] - 3' - 5,9 - trimethyl - 6,7 - benzomorphan hydrochloride, m.p.: 214°–217° C.

IR$\nu_{Paraffin}^{cm.^{-1}}$: 3150, 2600, 1675, 1610, 1590, 1500, 1025, 833

Anal.—Calcd. for $C_{25}H_{31}NO_2FCl$: C, 69.51; H, 7.23; N, 3.24; Cl, 8.21%. Found: C, 69.38; H, 7.35; N, 3.10; Cl, 8.01%.

EXAMPLE 39

α-2'-Hydroxy-2-[δ-(p-methoxybenzoyl)-n-butyl]-3',5,9-trimethyl-6,7-benzomorphan (a) α - 2' - Hydroxy-2-[5''-(p-methoxyphenyl)-5'',5''-ethylenedioxy-n-pentyl] - 3' - 5,9 - trimethyl-6,7-benzomorphan: According to the procedure of Example 38(a), the reaction of 1.15 g. of α-2'-hydroxy-3'-5,9-trimethyl-6,7-benzomorphan with 1.5 g. of 5-(p-methoxyphenyl)-5,5 - ethylenedioxy-1-chloropentane gives α-2'-hydroxy-2-[5''-(p-methoxyphenyl) - 5'',5''-ethylenedioxy-n-pentyl]-3',5,9-trimethyl-6,7-benzomorphan.

IR$\nu_{Paraffin}^{cm.^{-1}}$: 2650, 1600, 1570, 1505, 1170, 1025, 835

(b) α - 2'-Hydroxy-2-[δ-(p-methoxybenzoyl)-n-butyl]-3',5,9 - trimethyl-6,7-benzomorphan: According to the procedure of Example 38(b), α-2' - hydroxy-2-[5''-(p-methoxyphenyl) - 5'',5'' - ethylenedioxy-n-pentyl]-3',5,9-trimethyl-6,7-benzomorphan converts to α-2'-hydroxy-2-[δ-(p - methoxybenzoyl)-n-butyl] - 3',5,9 - trimethyl-6,7-benzomorphan, m.p.: 128°–130° C.

IR$\nu_{Paraffin}^{cm.^{-1}}$: 2650, 1668, 1600, 1570, 842, 760

Anal.—Calcd. for $C_{27}H_{35}NO_3$: C, 76.92; H, 8.37; N, 3.32%. Found: C, 76.47; H, 7.94; N, 3.26%.

EXAMPLE 40

α-2'-Acetoxy-2-[γ-(p-fluorobenzoyl)-n-propyl]5,9-dimethyl-6,7-benzomorphan

A mixture of 3.82 g. of α-2' - hydroxy-2-[γ-(p-fluorobenzoyl)-n - propyl] - 5,9 - dimethyl-6,7-benzomorphan and 20 ml. of acetic anhydride is stirred at 96°–97.5° C. for one hour, cooled and poured into ice water. The resultant mixture is made alkaline with aqueous potassium hydroxide (50%) while keeping ice cold, and the liberated base is shaken quickly into ether. The ether extract is washed, dried and filtered. The filtrate is evaporated and allowed to stand in the refrigerator. The precipitate obtained is collected and recrystallized from acetone-ether to yield α-2′ - acetoxy-2-[γ-(p-fluorobenzoyl)-n-propyl]-5,9-dimethyl - 6,7 - benzomorphan acetate, m.p.: 188°–189.5° C.

$IR \nu_{Paraffin}^{cm.^{-1}}$: 2420, 1760, 1700, 1600, 1500, 1460

EXAMPLE 41

Step 1: β-2′-Nitro-2,5,9-trimethyl-6,7-benzomorphan

β-2,5,9-Trimethyl-6,7-benzomorphan (6.5 g.) in glacial acetic acid (14 ml.) is added dropwise to an ice-cold mixture of fuming $HNO_3$ (34 ml.) and glacial acetic acid (21 ml.). The mixture is stirred overnight at 25° C., and the solvent is removed in vacuo.

Ice, water and $NH_4OH$ are added to the oily residue, and crystals produced are then recrystallized from methanol to give β-2′-nitro-2,5,9-trimethyl-6,7-benzomorphan, m.p.: 141.5°–142.5° C.

The basic solution is extracted with ether, and the product obtained from the ether extract is recrystallized from methanol to give β-1′-nitro or β-4′ - nitro - 2,5,9-trimethyl-6,7 - benzomorphan, m.p.: 121°–122 ° C. besides β-2′-nitro-2,5,9-trimethyl-6,7-benzomorphan.

Anal.—Calcd. for β-2′ - nitro - 2,5,9 - trimethyl-6,7-benzomorphan ($C_{15}H_{20}N_2O_2$): C, 69.20; H, 7.74; N, 10.76%. Found: C, 69.29; H, 7.88; N, 10.91%.

Anal.—Calcd. for β-1′- or 4′-nitro-2,5,9-trimethyl-6,7-benzomorphan ($C_{15}H_{20}N_2O_2$): C, 69.20; H, 7.74; N, 10.76%. Found: C, 69.12; H, 7.83; N, 10.66%.

Step 2: β-2′-Amino-2,5,9-trimethyl-6,7-benzomorphan

Zinc powder (30 g.) is added dropwise to a mixture of β-2′-nitro-2,5,9-trimethyl-6,7-benzomorphan (4.1 g.), concentrated hydrochloric acid (100 ml.) and water (50 ml.).

The mixture is stirred for 1.5 hours at 90°–100° C. and $NH_4OH$ is added to this mixture.

The basic solution is extracted with chloroform.

The extract is dried ($MgSO_4$) and filtered, and the solvent is removed in vacuo to give 3.6 g. of an oily residue.

The product is converted to the hydrochloride salt which is recrystallized from a mixture of acetone and methanol to give β - 2′ - amino-2,5,9-trimethyl-6,7-benzomorphan, m.p.: 278°–282° C. (decomp.).

Step 3: β-2′-Hydroxy-2,5,9-trimethyl-6,7-benzomorphan

To β - 2′ - amino - 2,5,9-trimethyl-6,7-benzomorphan (3.35 g.) in 30 ml. of 3N sulfuric acid is adde (0°, stirring) during 20 min. 1.21 g. of sodium nitrite in 10 ml. of water. The solution is then treated at 70° C. with a solution of 20 ml. of water and 20 ml. of sulfuric acid, warmed at 80° C. in 30 min., poured into ice-water. $NH_4OH$ is added to this solution and extracted with chloroform. The dried extract is evaporated to give 3.65 g. of a red-brown residue which is crystallized from ether and then recrystallized from acetone to give β-2′-hydroxy-2,5,9 - trimethyl - 6,7-benzomorphan, m.p.: 202°–208° C.

What is claimed is:
1. A benzomorphan derivative of the formula:

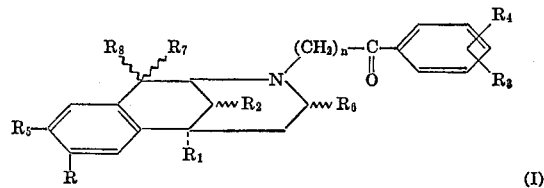

(I)

wherein R is a hydrogen atom, a $C^1$–$C^3$ alkoxy group, an acetoxy group, a hydroxyl group, a nitro group, a halogen atom, a cyano group, an amino group, a carboxyl group, a carbamoyl group or a sulfo group; $R_1$ is a hydrogen atom, a $C^1$–$C^3$ alkyl group or a group of the formula, $(CmH_{(2m-p)+1})$—$(R_9)_p$ (wherein m is an integer of 1–6; p is an integer of 1–2; and $R_9$ is a hydroxyl group or a $C^1$–$C^3$ alkoxy group); $R_2$ is a hydrogen atom or a $C^1$–$C^3$ alkyl group; $R_3$ and $R_4$ are independently a hydrogen atom, a halogen atom, a $C^1$–$C^3$ alkyl group, a $C^1$–$C^3$ alkoxy group, a $C^1$–$C^3$ alkylthio group, a nitro group, a trifluoromethyl group, an amino group or a hydroxyl group, or $R_7$ and $R_8$ may from a $C^1$–$C^3$ alkylidene group hydrogen atom or a $C^1$–$C^3$ alkyl group; $R_7$ is a hydrogen atom, a $C^1$–$C^3$ alkyl group, a phenyl group or a $C^1$–$C^3$ alkoxyphenyl group; $R_8$ is a hydrogen atom or a hydroxyl group, or $R_7$ and $R_8$ may form a $C^1$–$C^3$ alkylidene group or a carbonyl group together with a carbon atom to which these substituents are bonded; and n is an integer of 2–4, provided that, when n is an integer of 2; $R_1$ and $R_2$ are methyl groups; R is a hydrogen atom or a hydroxyl group; and $R_4$, $R_5$, $R_6$, $R_7$ and $R_8$ are hydrogen atoms, $R_3$ must be a halogen atom, $C^1$–$C^3$ alkyl group, a $C^1$–$C^3$ alkoxy group, a $C^1$–$C^3$ alkylthio group, a nitro group, a trifluoromethyl group, an amino group or a hydroxyl group.

2. A benzomorphan derivative of the formula:

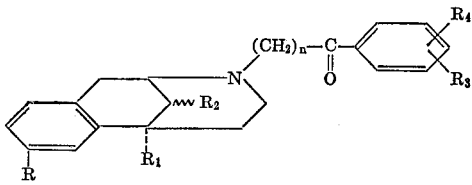

wherein R is a hydrogen atom, a hydroxyl group or a $C^1$–$C^3$ alkoxy group; $R_1$ and $R_2$ are independently $C^1$–$C^3$ alkyl groups; n is an integer of 3 or 4; and $R_3$ and $R_4$ are as defined in Claim 1.

3. 2′ - Hydroxy - 2-[γ-(p-fluorobenzoyl)-n-propyl]-5,9-dimethyl-6,7-benzomorphan.

4. 2′ - Hydroxy - 2 - [γ-(p-fluorobenzoyl)-n-propyl]-5-methyl-9-ethyl-6,7-benzomorphan.

5. 2′ - Hydroxy-2-[γ-(p-methoxybenzoyl)-n-propyl]-5-methyl-9-ethyl-6,7-benzomorphan.

6. 2′ - Hydroxy - 2 - [γ - (3,4 - dimethoxybenzoyl) - n-propyl]-5,9-dimethyl-6,7-benzomorphan.

7. 2 - [γ - (p - Fluorobenzoyl)-n-propyl]-5,9-dimethyl-6,7-benzomorphan.

8. 2′ - Hydroxy - 2-[γ-(p-methoxybenzoyl)-n-propyl]-5,9-dimethyl-6,7-benzomorphan.

9. 2′ - Hydroxy - 2-(γ-benzoyl-n-propyl)-5,9-dimethyl-6,7-benzomorphan.

10. 2′ - Hydroxy - 2-(γ-benzoyl-n-propyl)-5-methyl-9-ethyl-6,7-benzomorphan.

11. 2′ - Methoxy-2-[γ-(p-fluorobenzoyl)-n-propyl]-5,9-dimethyl-6,7-benzomorphan.

12. 2′ - Acetoxy-2-[γ-(p-fluorobenzoyl)-n-propyl]-5,9-dimethyl-6,7-benzomorphan.

13. 2'-Hydroxy - 2 - [γ-(m-fluorobenzoyl)-n-propyl]-5,9-dimethyl-6,7-benzomorphan.

14. A benzomorphan derivative of the formula:

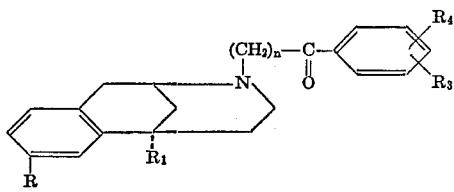

wherein R is a hydrogen atom, a hydroxyl group, an acetoxy group or a $C^1$–$C^3$ alkoxy group; $R_1$ is a $C^1$–$C^3$ alkyl group; $n$ is an integer of 3 or 4; and $R_3$ and $R_4$ are as defined in Claim 1.

15. 2'-Hydroxy - 2 - [γ-(p-fluorobenzoyl)-n-propyl]-5-methyl-6,7-benzomorphan.

16. 2-(γ-Benzoyl-n-propyl) - 5 - methyl - 6,7 - benzomorphan.

17. 2-[γ-(p-Fluorobenzoyl)-n-propyl] - 5 - methyl-6,7-benzomorphan.

18. 2' - Hydroxy-2-[γ-(p-methoxybenzoyl)-n-propyl]-5-methyl-6,7-benzomorphan.

19. 2' - Hydroxy-2-(γ-benzoyl-n-propyl) - 5 - methyl-6,7-benzomorphan.

20. A benzomorphan derivative of the formula:

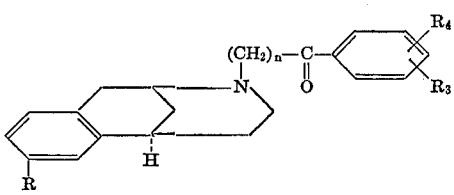

wherein R is a hydrogen atom, a hydroxyl group, an acetoxy group or a $C^1$–$C^3$ alkoxy group; $n$ is an integer of 3 or 4; and $R_3$ and $R_4$ are as defined in Claim 1.

21. 2'-Hydroxy - 2 - [γ-(p-fluorobenzoyl)-n-propyl]-6,7-benzomorphan.

22. 2-[γ-(p-Fluorobenzoyl)-n-propyl] - 6,7 - benzomorphan.

23. 2' - Hydroxy-2-[γ-(p-methoxybenzoyl)-n-propyl]-6,7-benzomorphan.

24. 2'-Hydroxy - 2 - (γ-benzoyl-n-propyl)-6,7-benzomorphan.

25. A benzomorphan derivative of the formula:

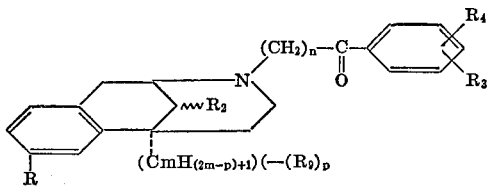

wherein R is a hydrogen atom, a hydroxyl group or a $C^1$–$C^3$ alkoxy group; $R_2$ is a hydrogen atom or a $C^1$–$C^3$ alkyl group; $n$ is an integer of 3 or 4; and $R_3$, $R_4$, $R_9$, $m$ and $p$ are as defined in Claim 1.

26. A benzomorphan derivative of the formula:

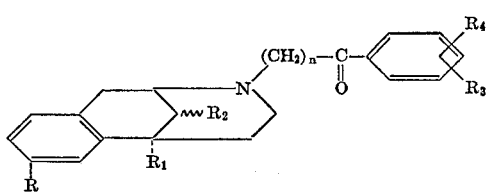

wherein R is a halogen atom, a nitro group, an amino group, a cyano group, a carboxyl group, a carbamoyl group or a sulfo group; $R_1$ and $R_2$ are hydrogen atoms or $C^1$–$C^3$ alkyl groups; and $R_3$, $R_4$ and $n$ are as defined in Claim 1.

27. A benzomorphan derivative of the formula:

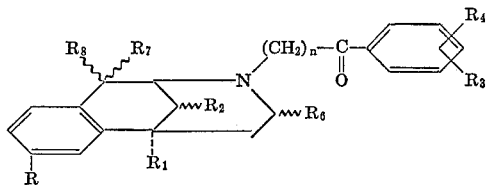

wherein R is a hydrogen atom, a hydroxyl group or a $C^1$–$C^3$ alkoxy group; $R_1$ and $R_2$ are hydrogen atoms or $C^1$–$C^3$ alkyl groups; and $R_3$, $R_4$, $R_6$, $R_7$, $R_8$ and $n$ are as defined in Claim 1, provided that when $R_7$ and $R_8$ are hydrogen atoms, $R_6$ must be a $C^1$–$C^3$ alkyl group.

28. 2'-Hydroxy - 2 - [γ-(p-fluorobenzoyl)-n-propyl]-5,8,9-trimethyl-6,7-benzomorphan.

29. A benzomorphan derivative of the formula:

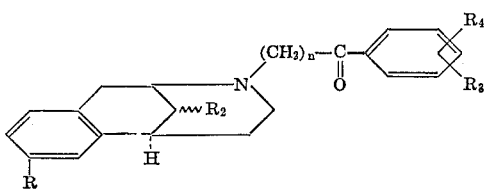

wherein R is a hydrogen atom, a hydroxyl group, an acetoxy group or a $C^1$–$C^3$ alkoxy group; $R_2$ is a $C^1$–$C^3$ alkyl group; $n$ is an integer of 3 or 4; and $R_3$ and $R_4$ are as defined in Claim 1.

30. 2'-Hydroxy - 2 - [γ-(p-fluorobenzoyl)-n-propyl]-9-methyl-6,7-benzomorphan.

31. 2' - Hydroxy-2-[γ-(p-methoxybenzoyl)-n-propyl]-9-methyl-6,7-benzomorphan.

32. 2' - Hydroxy-2-(γ-benzoyl-n-propyl)-9-methyl-6,7-benzomorphan.

33. 2 - [γ-(p-Fluorobenzoyl)-n-propyl]-9-methyl-6,7-benzomorphan.

34. A benzomorphan derivative of the formula:

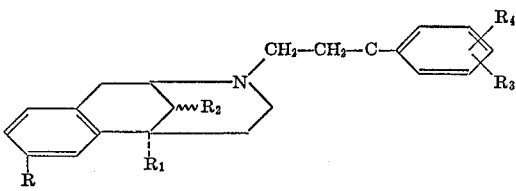

wherein R is a hydrogen atom, a hydroxyl group, an acetoxy group or a $C^1$–$C^3$ alkoxy group; $R_1$ and $R_2$ are hydrogen atoms or $C^1$–$C^3$ alkyl groups; and $R_3$ and $R_4$ are as defined in Claim 1.

35. 2' - Hydroxy-2-[β-(p-fluorobenzoyl)ethyl]-5,9-dimethyl-6,7-benzomorphan.

36. 2' - Hydroxy - 2 - [β-(p-fluorobenzoyl)ethyl]-6,7-benzomorphan.

37. 2'-Hydroxy - 2 - [β-(p-methoxybenzoyl)ethyl]-5,9-dimethyl-6,7-benzomorphan.

38. 2' - Hydroxy - 2 - [β-(p-fluorobenzoyl)ethyl]-5-methyl-6,7-benzomorphan.

39. 2'-Hydroxy - 2 - [β-(p-methoxybenzoyl)ethyl]-5-methyl-6,7-benzomorphan.

40. 2'-Hydroxy - 2 - [β-(p-methoxybenzoyl)ethyl]-6,7-benzomorphan.

41. 2'-Hydroxy-2-[β-(p-fluorobenzoyl)ethyl]-9-methyl-6,7-benzomorphan.

42. 2'-Hydroxy-2-[β-(p-methoxybenzoyl)ethyl]-9-methyl-6,7-benzomorphan.

43. A benzomorphan derivative of the formula:

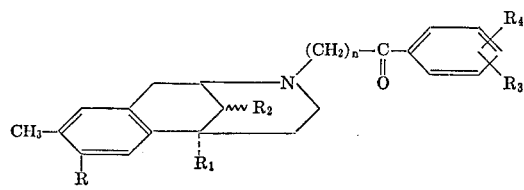

wherein R is a hydrogen atom, a hydroxyl group or a $C^1$–$C^3$ alkoxy group; $R_1$ and $R_2$ are hydrogen atoms or $C^1$–$C^3$ alkyl groups; and $R_3$, $R_4$ and $n$ are as defined in Claim 1.

44. 2'-Hydroxy-3'-methyl-2-[γ-(p-fluorobenzoyl)-n-propyl]-5,9-dimethyl-6,7-benzomorphan.

References Cited

UNITED STATES PATENTS

| | | | |
|---|---|---|---|
| 3,480,638 | 11/1969 | Block et al. | 260—Dig. 13 |
| 3,632,591 | 1/1972 | Albertson et al. | 260—Dig. 13 |
| 2,959,594 | 11/1960 | Gordon et al. | 260—Dig. 13 |
| 3,069,426 | 12/1962 | Janssen | 260—293.75 |
| 3,138,603 | 6/1964 | May | 260—Dig. 13 |
| 3,438,991 | 4/1969 | Janssen | 260—293.8 |
| 3,466,293 | 9/1969 | Johnson et al. | 260—340.9 |
| 3,476,762 | 11/1969 | Biel | 260—293.79 |

HENRY R. JILES, Primary Examiner

S. D. WINTERS, Assistant Examiner

U.S. Cl. X.R.

260—Dig. 13, 570.8 R, 590; 424—267